(12) United States Patent
Verma et al.

(10) Patent No.: US 11,802,640 B2
(45) Date of Patent: Oct. 31, 2023

(54) TUBE COUPLING

(71) Applicant: General Electric Company, Schenectady, NY (US)

(72) Inventors: Naleen Kumar Verma, Bengaluru (IN); Omkar Topkar, Bengaluru (IN); Dharmaraj Pachaiappan, Bengaluru (IN); Daniel Drew Smith, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 105 days.

(21) Appl. No.: 17/478,316

(22) Filed: Sep. 17, 2021

(65) Prior Publication Data

US 2023/0029012 A1    Jan. 26, 2023

(30) Foreign Application Priority Data

Jul. 20, 2021 (IN) .............................. 202111032529

(51) Int. Cl.
| | |
|---|---|
| *F16L 13/14* | (2006.01) |
| *F16L 27/04* | (2006.01) |
| *F16L 27/073* | (2006.01) |
| *F16L 37/52* | (2006.01) |

(52) U.S. Cl.
CPC ........... *F16L 13/146* (2013.01); *F16L 13/142* (2013.01); *F16L 13/147* (2013.01); *F16L 27/04* (2013.01); *F16L 27/073* (2013.01); *F16L 37/52* (2013.01)

(58) Field of Classification Search
CPC ......... F16L 27/04; F16L 27/06; F16L 27/023; F16L 27/026; F16L 27/02; F16L 27/073; F16L 27/125; F16L 37/50; F16L 37/52

USPC .................................................. 285/261, 263
See application file for complete search history.

(56) References Cited

U.S. PATENT DOCUMENTS

| | | | | |
|---|---|---|---|---|
| 2,475,834 | A | * | 7/1949 | Harvey |
| 2,556,659 | A | * | 6/1951 | Patterson ................ F16L 37/52 |
| 2,604,339 | A | * | 7/1952 | Kaysing |
| 4,856,822 | A | * | 8/1989 | Parker .................... F16L 27/04 |
| 5,332,270 | A | * | 7/1994 | Petty |

(Continued)

FOREIGN PATENT DOCUMENTS

| | | |
|---|---|---|
| CN | 107489831 A | 12/2017 |
| CN | 112922930 A * | 6/2021 |

(Continued)

OTHER PUBLICATIONS

CN 112922930 A—Machine Translation—English (Year: 2021).*

(Continued)

*Primary Examiner* — Zachary T Dragicevich
*Assistant Examiner* — William S. Choi
(74) *Attorney, Agent, or Firm* — Venable LLP; Elizabeth C. G. Gitlin; Michele V. Frank

(57) ABSTRACT

A tube coupling for coupling a first tube and a second tube. The tube coupling includes an inner shroud including a ball portion and an outer shroud including a socket portion. The socket portion receives the ball portion. The tube coupling includes a compressive ring configured to elastically compress the outer shroud onto the inner shroud. The ball portion and the socket portion form a ball and socket joint. The ball and socket joint allows relative angular movement and relative axial movement between the inner shroud and the outer shroud.

22 Claims, 15 Drawing Sheets

(56) References Cited

U.S. PATENT DOCUMENTS

| | | | |
|---|---|---|---|
| 5,611,577 | A | 3/1997 | Meyer et al. |
| 6,517,126 | B1 | 2/2003 | Peterson et al. |
| 9,194,514 | B2 | 11/2015 | McKay |
| 9,869,413 | B2 | 1/2018 | Laakso et al. |
| 9,982,813 | B2 | 5/2018 | Dobmeier et al. |
| 2010/0254758 | A1 | 10/2010 | Campbell et al. |
| 2015/0192230 | A1 | 7/2015 | Jenkins et al. |
| 2016/0305584 | A1 | 10/2016 | Delmer |
| 2018/0156369 | A1* | 6/2018 | Tajiri ................... F16L 27/073 |
| 2020/0263817 | A1* | 8/2020 | Robinault ............... F16L 37/52 |

FOREIGN PATENT DOCUMENTS

| | | |
|---|---|---|
| DE | 202014100764 U1 | 3/2014 |
| DE | 202017106289 U1 | 10/2017 |
| EP | 0632224 A2 | 1/1995 |
| EP | 2837868 A1 | 2/2015 |
| KR | 20030050317 A | 6/2003 |
| WO | 1998008017 A2 | 2/1998 |
| WO | 2013063715 A1 | 5/2013 |
| WO | 2018236693 A1 | 12/2018 |

OTHER PUBLICATIONS

Sargent Aerospace & Defense, "Case Study: Designing In Long Term Reliabilty and Fuel Efficiencies with Airtomic Ducting Solutions," pp. 1-5 (2011).

Parker Hannifin Corporation, "Phastite® for Pipe Connection System: A Non-Welded System for High-Pressure Piping," pp. 1-6 (2013).

\* cited by examiner

TUBE COUPLING

CROSS-REFERENCE TO RELATED APPLICATIONS

The present application claims priority to Indian Patent Application No. 202111032529, filed Jul. 20, 2021, which is hereby incorporated by reference in its entirety.

TECHNICAL FIELD

The present disclosure relates to tube couplings for coupling two tubes together. More particularly, the present disclosure relates to weld-free tube couplings for coupling two tubes together.

BACKGROUND

Tubes provide fluids to many systems and devices. For example, tubes may provide fluids to engines, to aircraft environments, to cooling systems, etc. In order to provide the orientation, placement, and length of tubes needed in these applications, multiple tubes are often coupled together with tube couplings. The tube couplings provide permanent connections or temporary connections between tubes and also provide fluid tight connections between tubes.

BRIEF SUMMARY

According to an embodiment of the present disclosure, a tube coupling for coupling a first tube and a second tube includes an inner shroud including a ball portion, an outer shroud including a socket portion, the socket portion configured to receive the ball portion, and a compressive ring configured to elastically compress the outer shroud onto the inner shroud. The ball portion and the socket portion form a ball and socket joint, the ball and socket joint configured to allow relative angular movement and relative axial movement between the inner shroud and the outer shroud.

According to an embodiment of the present disclosure, a tube assembly includes a first tube, a second tube, and a tube coupling for coupling the first tube to the second tube. The tube coupling includes an inner shroud including a ball portion, an outer shroud including a socket portion, the socket portion configured to receive the ball portion, and a compressive ring configured to elastically compress the outer shroud onto the inner shroud. The ball portion and the socket portion form a ball and socket joint, the ball and socket joint configured to allow relative angular movement and relative axial movement between the first tube and the second tube.

Additional features, advantages, and embodiments of the present disclosure are set forth or apparent from a consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

The tube couplings of the present disclosure provide a weld-free, permanent coupling between tubes. The tube couplings may include a ball and socket joint that may allow for angular movement, axial movement, or both angular movement and axial movement. The tube couplings may include bands and/or compressive rings formed of shape memory alloys, which may allow for the couplings to provide a weld-free, permanent connection.

Figure 1:
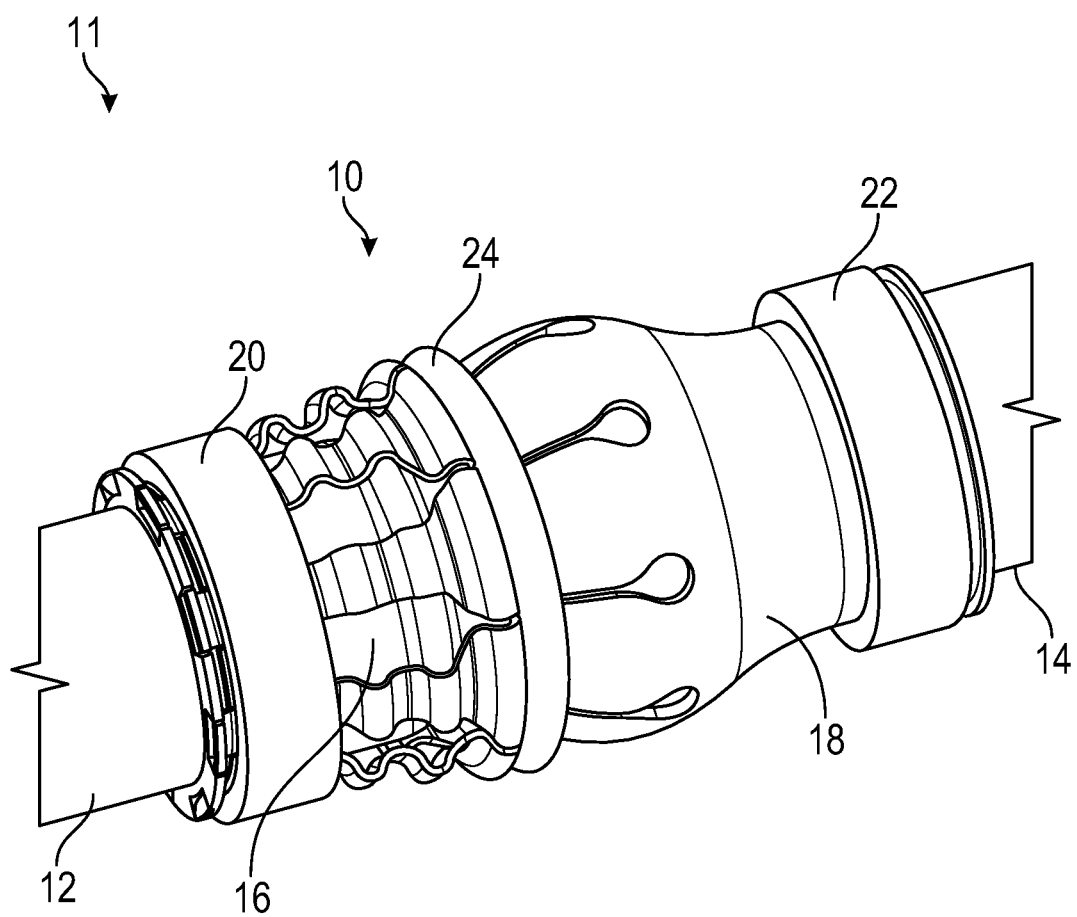
FIG. 1 shows a schematic perspective view of a tube coupling, according to an embodiment of the present disclosure.
Figure 2:
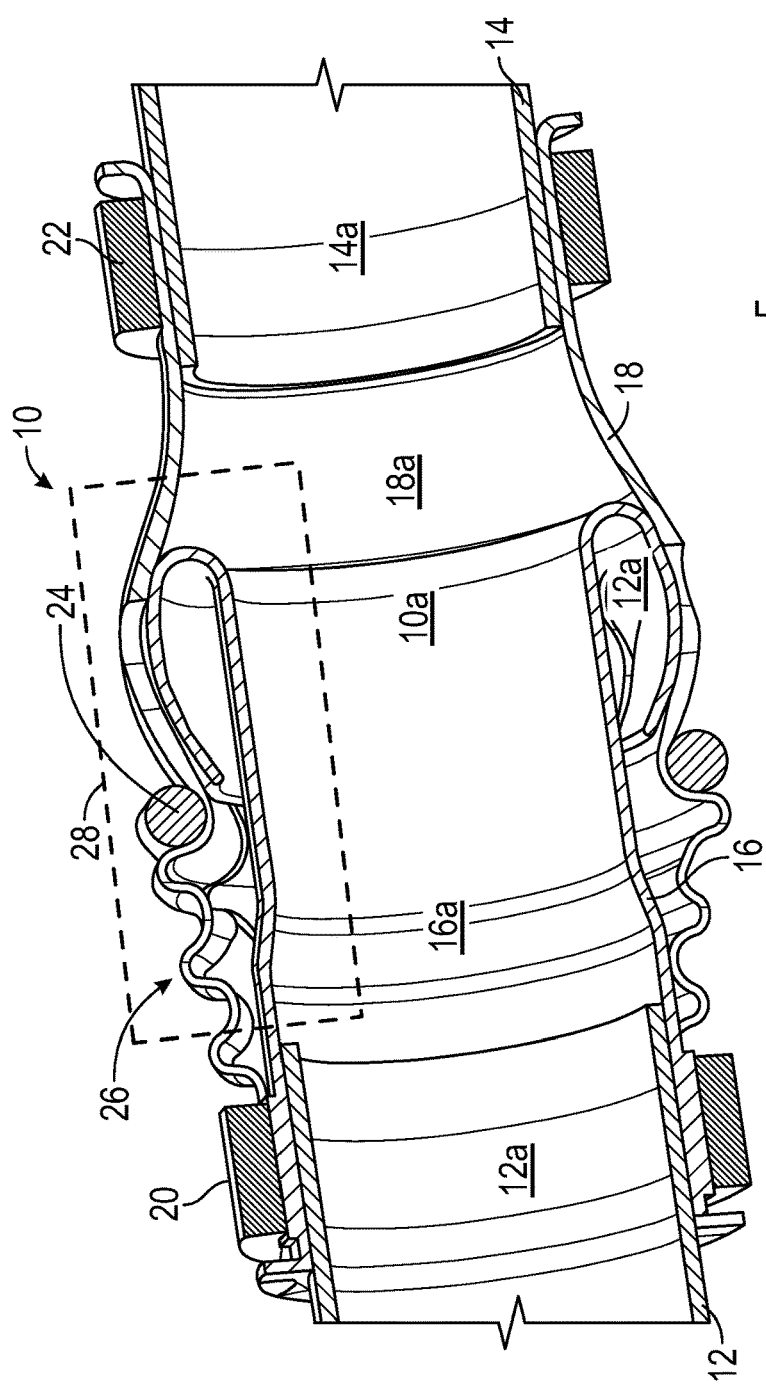
FIG. 2 shows a schematic cross-sectional perspective view of the tube coupling of FIG. 1, taken along a center axis of the tube coupling, according to an embodiment of the present disclosure.
Figure 3:
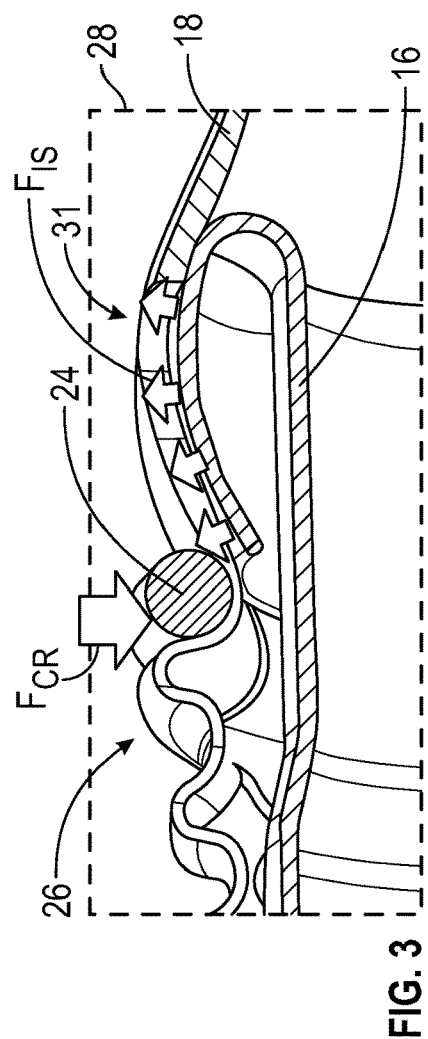
FIG. 3 shows a schematic enlarged view of a portion of the tube coupling of FIG. 2, according to an embodiment of the present disclosure.

FIGS. 1 to 3 show a tube coupling 10. The tube coupling 10 may couple or connect a first tube 12 with a second tube 14 to form a tube assembly 11. The first tube 12 and/or the second tube 14 may be a tube, a pipe, a rod, or the like. The tube coupling 10 may include an inner shroud 16 and an outer shroud 18. The tube coupling 10 may include a first band 20, a second band 22, and a compressive ring 24. When assembled, the tube coupling 10 may connect the first tube 12 to the second tube 14 without brazes and/or without welds. That is, the tube coupling 10 may be a non-brazed and non-welded tube coupling. The tube coupling 10 may be considered to be weldless.

FIG. 2 shows a schematic cross-sectional perspective view of the tube coupling 10. As shown in FIG. 2, the first tube 12 has an interior or bore 12a and the second tube 14 has an interior or bore 14a. The bore 12a and the bore 14a are coupled together by a bore 10a of the tube coupling 10. The bore 10a may be formed by a bore 16a of the inner shroud 16 and a bore 18a of the outer shroud 18. Accordingly, when coupled together with the tube coupling 10, fluid may flow through the first tube 12 and the second tube 14 via the interconnected bore formed by bore 12a, bore 10a (formed of bore 16a and bore 18a), and bore 14a.

With reference to FIGS. 2 and 3, the compressive ring 24 of the tube coupling 10 may secure the outer shroud 18 to the inner shroud 16. The compressive ring 24 may be located adjacent to one or more spring fingers 26 of the outer shroud 18. The outer shroud 18 may be elastically compressed with a compressive force $F_{CR}$ due to the compressive ring 24 on the inner shroud 16. The inner shroud 16 may generate an outward elastic force $F_{IS}$ in reaction to the inward, compressive force $F_{CR}$. The outward elastic force $F_{IS}$ may be generated as the inner shroud 16 is lightly pressed inside the outer shroud 18. The compressive ring 24 may maintain elastic force on the outer shroud 18.

Referring to the FIG. 2 and enlarged portion 28 in FIG. 3, the compressive force $F_{CR}$ may form a ball and socket joint 31 between the outer shroud 18 and the inner shroud 16. The inner shroud 16 may form the ball portion (e.g., FIG. 6, 50) and the outer shroud 18 may form the socket portion (e.g., FIG. 7, 70) of the ball and socket joint 31. The ball and socket joint 31 may facilitate angulation and torsional rotation between the inner shroud 16 and the outer shroud 18. The compressive force $F_{CR}$ of the compressive ring 24 generates an elastic radial force that may maintain the outer shroud 18 socket always in contact with the inner shroud 16 ball. The elastic engagement between the ball portion of the inner shroud 16 and the socket portion of the outer shroud 18 may maintain the two sliding surfaces of the ball portion and the socket portion in contact over the period of use. This may compensate for looseness and/or material wear caused by use of the tube coupling 10. The spring fingers 26 may facilitate axial sliding. This may allow for optimum flexibility and may be obtained by varying the convolutions (e.g., crests and valleys) and thickness of the spring finger spring portion 26b (FIG. 7) of the spring fingers 26.

Figure 4A:
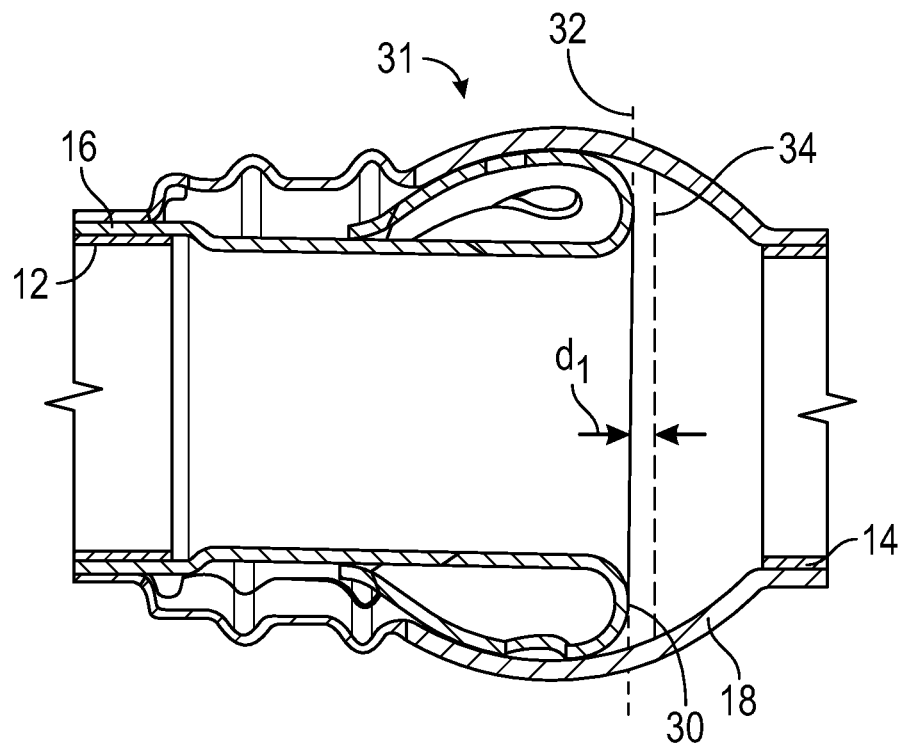
FIG. 4A shows a schematic cross-sectional view of a tube coupling in a first lateral position, according to an embodiment of the present disclosure.
Figure 4B:
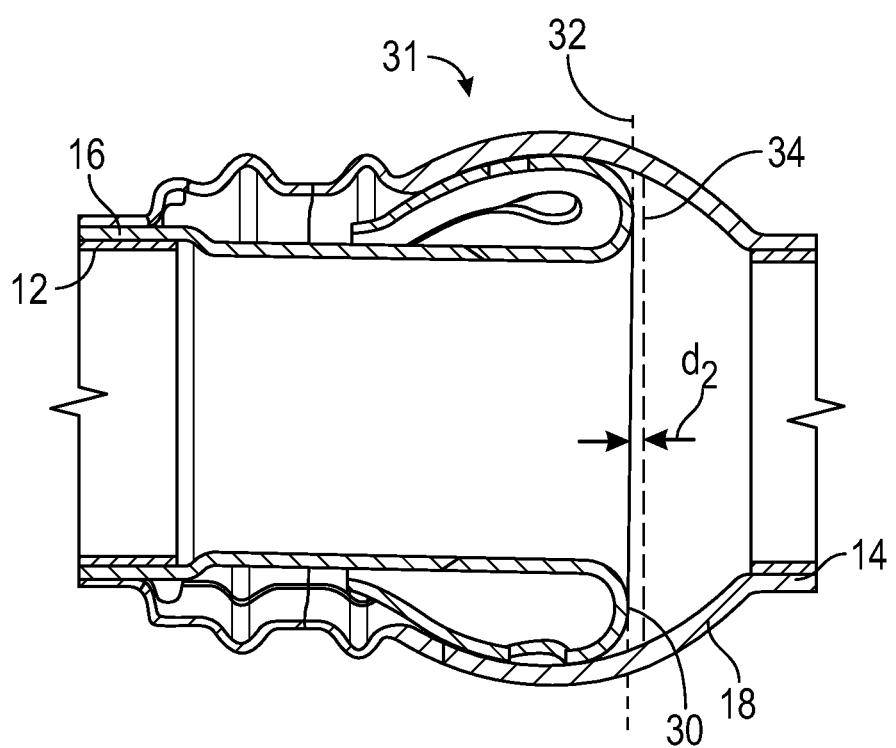
FIG. 4B shows a schematic cross-sectional view of the tube coupling of FIG. 4A in a second lateral position, according to an embodiment of the presented disclosure.

The tube coupling 10 may allow for axial sliding and axial sliding displacement of the first tube 12 with respect to the second tube 14. The ball portion 50 (FIG. 6) of the inner shroud 16 may slide within the socket portion 70 (FIG. 7) of the outer shroud 18. FIGS. 4A and 4B show the ball and socket joint 31 of the tube coupling 10 in a first lateral position (FIG. 4A) and a second lateral position (FIG. 4B) due to the axial sliding. The tube coupling 10 is shown coupling the first tube 12 and the second tube 14. An inner shroud terminal end 30 of the inner shroud 16 may be positioned at a first lateral position, as shown in FIG. 4A The first lateral position may be defined by a position of an inner shroud axis 32 extending through the inner shroud terminal end 30 with respect to an outer shroud axis 34 extending through a selected point of the outer shroud 18. At the first lateral position, the inner shroud axis 32 (and, thus, the inner shroud terminal end 30 of the inner shroud 16) may be a distance $d_1$ from the outer shroud axis 34. In the second lateral position (FIG. 4B), the inner shroud axis 32 may be a distance $d_2$ from the outer shroud axis 34. Thus, as shown in FIGS. 4A and 4B, the tube coupling 10 may allow for lateral movement or axial sliding of the first tube 12 and the second tube 14 with respect to one another. The lateral movement may be axial movement along the direction of a central longitudinal axis of the tube coupling 10.

Figure 5A:
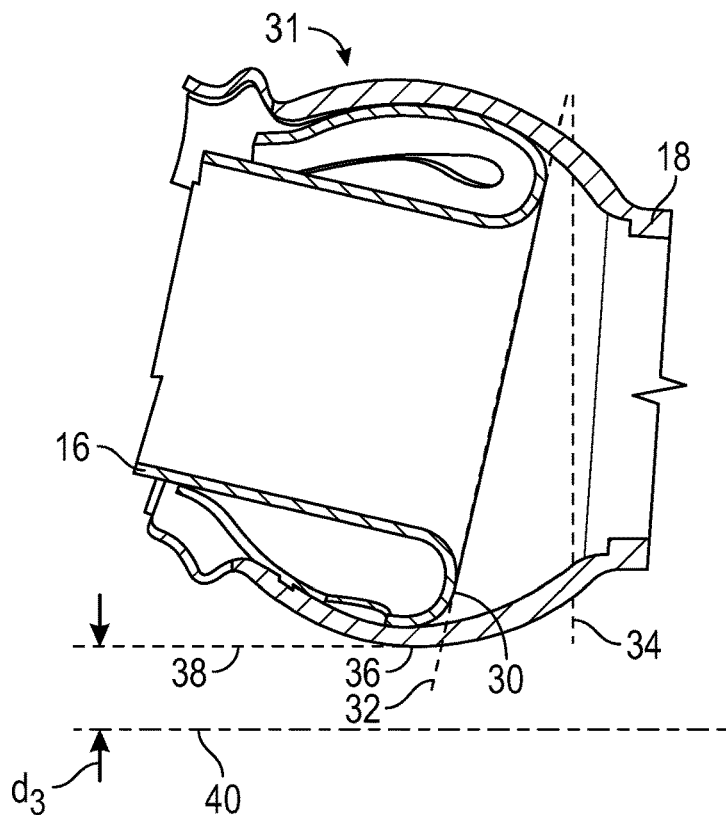
FIG. 5A shows a schematic cross-sectional view of a tube coupling in a first angular position, according to an embodiment of the present disclosure.
Figure 5B:
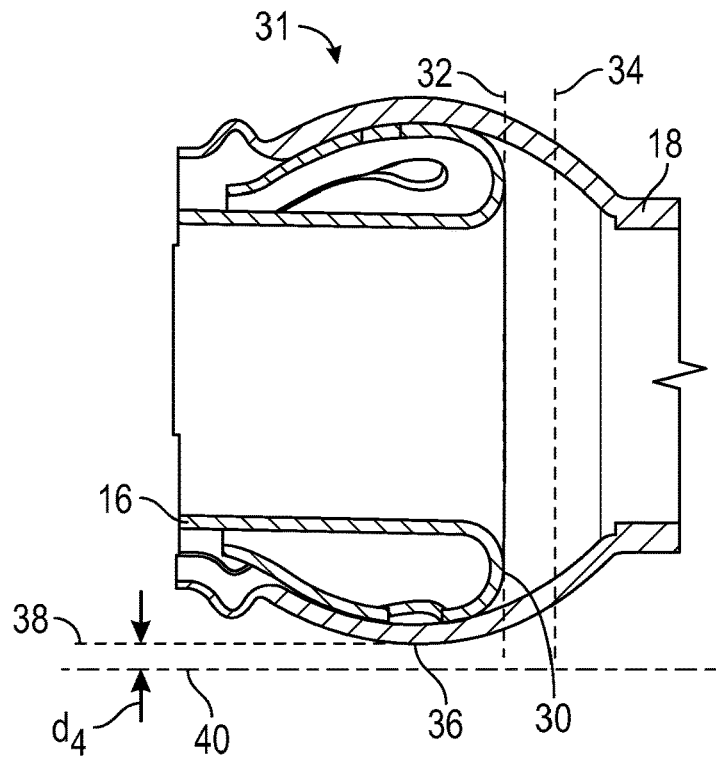
FIG. 5B shows a schematic cross-sectional view of the tube coupling of FIG. 5A in a second angular position, according to an embodiment of the presented disclosure.

The tube coupling 10 may allow for angulation and angulation rotation of the first tube 12 with respect to the second tube 14. The ball portion 50 (FIG. 6) of the inner shroud 16 may rotate within the socket portion 70 (FIG. 7) of the outer shroud 18. FIGS. 5A and 5B show the ball and socket joint 31 of the tube coupling 10 in a first angular position (FIG. 5A) and a second angular position (FIG. 5B) due to the angular rotation. The tube coupling 10 is shown coupling the first tube 12 and the second tube 14. An inner shroud terminal end 30 of the inner shroud 16 may be positioned at first angular position, as shown in FIG. 5A The first angular position may be defined by a position of the inner shroud axis 32 extending through the inner shroud terminal end 30 with respect to the outer shroud axis 34 extending through a selected point of the outer shroud 18. At the first angular position, the inner shroud axis 32 (and thus the inner shroud terminal end 30 of the inner shroud 16) may be at a first angle with respect to the outer shroud axis 34. In the second angular position (FIG. 5B), the inner shroud axis 32 may be at a second angle with respect to the outer shroud axis 34. Thus, as shown in FIGS. 5A and 5B, the tube coupling 10 may allow for angular movement of the first tube 12 and the second tube 14 with respect to one another. The angulation may be between about two degrees to about four degrees.

The angular movement may also result in a translation of the tube coupling 10 with respect to a reference axis 40 outside of the tube coupling 10. In the first angular position of FIG. 5A, an outer shroud tangent axis 38 extending through a point 36 at the largest diameter of the ball portion of the outer shroud 18 may be a distance $d_3$ with respect to the reference axis 40. In the second angular position of FIG. 5B, the outer shroud tangent axis 38 may be a distance $d_4$ with respect to the reference axis 40.

Figure 6:
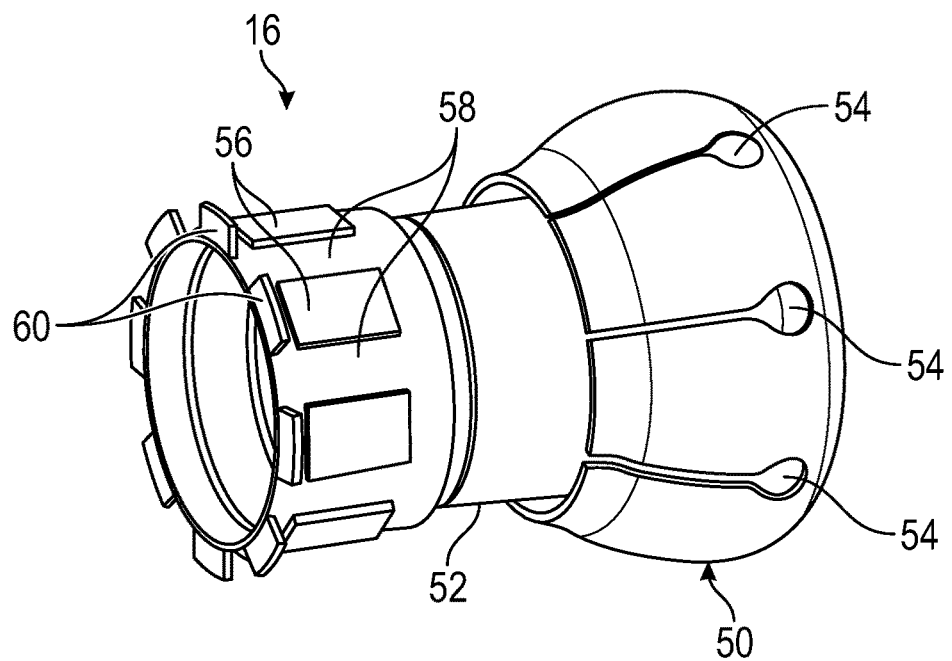
FIG. 6 shows a schematic perspective view of an inner shroud of a tube coupling, according to an embodiment of the present disclosure.
Figure 7:
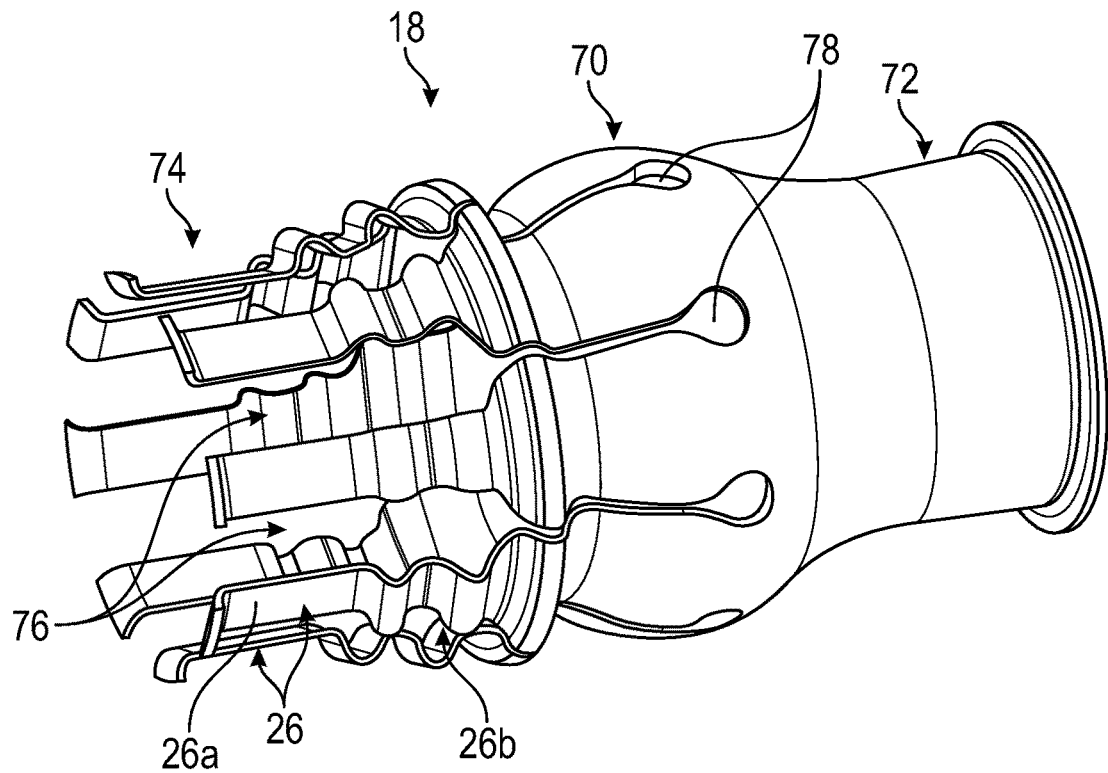
FIG. 7 shows a schematic perspective view of an outer shroud of a tube coupling, according to an embodiment of the present disclosure.

FIG. 6 shows a schematic perspective view of the inner shroud 16 of the tube coupling 10. The inner shroud 16 may include a ball portion 50 and an inner shroud longitudinal portion 52. The ball portion 50 may form the ball portion of a ball and socket joint, as described previously herein. The inner shroud longitudinal portion 52 may include a plurality of inner shroud flats 58 separated from one another with a plurality of inner shroud protrusions 56. The inner shroud longitudinal portion 52 may include a plurality of inner shroud flanges 60. The inner shroud flats 58 may receive spring fingers 26 (FIG. 7) of the outer shroud 18 (FIG. 7). The inner shroud protrusions 56 may operate to space the spring fingers 26 (FIG. 7) from one another. The ball portion 50 may include a plurality of ball portion openings 54. The plurality of ball portion openings 54 may be flexible cutouts in the ball portion 50 of the inner shroud 16. The plurality of ball portion openings 54 may allow for flexibility of the ball portion 50 during compression by the outer shroud 18.

FIG. 7 shows a schematic perspective view of the outer shroud 18 of the tube coupling 10. The outer shroud 18 may include a socket portion 70, spring fingers portion 74, and an outer shroud longitudinal portion 72. The socket portion 70 may form the socket of a ball and socket joint 31 (FIG. 8) as described herein. The socket portion 70 may receive the ball portion 50 of the inner shroud 16 in the tube coupling 10. The spring fingers portion 74 may include one or more spring fingers 26. Each of the one or more spring fingers 26 may include spring finger flat portions 26a and spring finger spring portions 26b. The spring finger spring portions 26b may present as convolutions (e.g., crests and valleys) within the spring fingers 26. Each spring finger 26 may be separated from an adjacent spring finger 26 by a spring finger opening 76. The socket portion 70 may include a plurality of socket portion openings 78. The plurality of socket portion openings 78 may be flexible cutouts and/or relief cuts. The plurality of socket portion openings 78 may allow for flexibility of the socket portion 70 of the outer shroud 18 during compression by the compressive ring 24.

Figure 8:
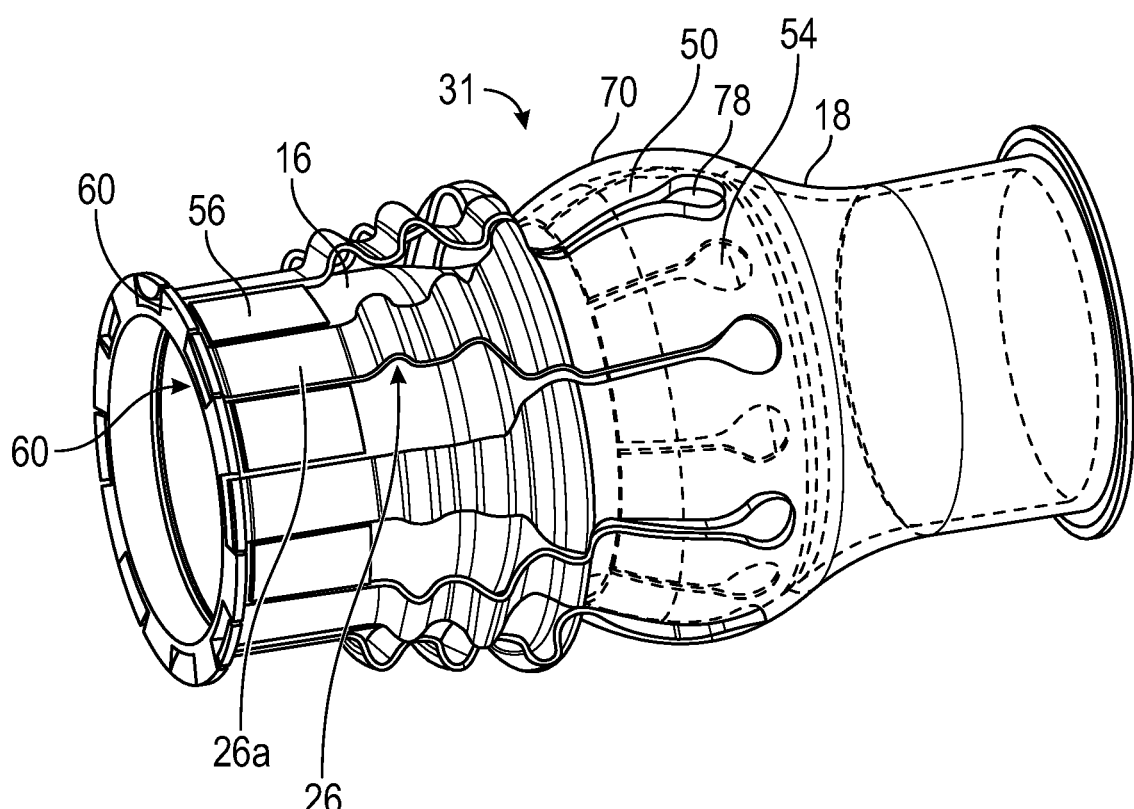
FIG. 8 shows a schematic perspective view of the inner shroud of FIG. 6 and the outer shroud of FIG. 7, according to an embodiment of the present disclosure.

FIG. 8 shows a schematic perspective view of the ball and socket joint 31. The ball and socket joint 31 may include the inner shroud 16 and the outer shroud 18 coupled together. When assembled, the plurality of inner shroud flats 58 (FIG. 6) may receive the spring finger flat portions 26a of the spring fingers 26. The inner shroud protrusions 56 may maintain the spring finger flat portions 26a in a particular position and may prevent rotation of the spring finger flat portions 26a with respect to the inner shroud 16. The socket portion openings 78 in the socket portion 70 may be misaligned with the ball portion openings 54 of the ball portion 50. The misalignment of the socket portion openings 78 and the ball portion openings 54 may generate a seal such that there is no leakage out of the ball and socket junction. There may be surface-to-surface contact between the ball portion 50 and the socket portion 70. The ball portion 50 may be elastically compressed due to the compressive force of the socket portion 70 created by the compressive ring 24 (FIG. 1).

Figure 9:
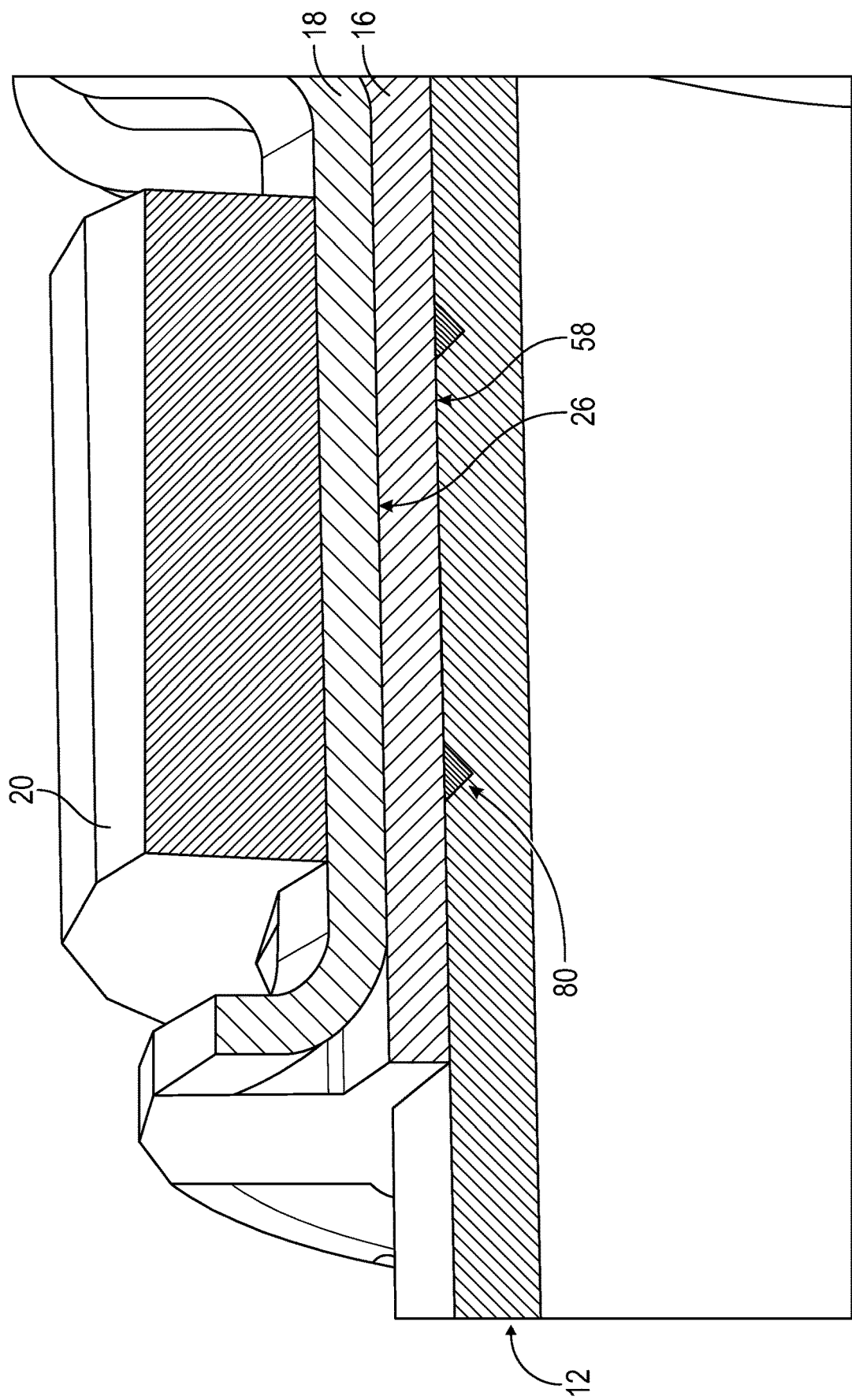
FIG. 9 shows a schematic enlarged view of a portion of a tube coupling, according to an embodiment of the present disclosure.

FIG. 9 shows a schematic enlarged view of a portion of the tube coupling 10 including the first band 20. A similar arrangement, or the same arrangement, may be present with respect to the second band 22 (FIG. 1). The first band 20 may be placed around the first tube 12, the inner shroud 16, and the outer shroud 18. The first band 20 may secure the three parts together. Radial teeth 80 may be provided on an inner surface of the inner shroud flats 58 of the inner shroud 16. The radial teeth 80 may provide a radial teeth seal between the inner shroud 16 and the first tube 12. The first band 20 may be any material or construction to secure the first tube 12, the inner shroud 16, and the outer shroud 18 together. In some examples, the first band 20 may be a shape memory alloy.

Accordingly, with reference to FIGS. 1 to 9, the tube coupling 10 may allow for axial, lateral movement of the first tube 12 and the second tube 14 with respect to each other. The spring fingers 26 of the outer shroud 18 may allow for the axial, lateral movement by being capable of compressing and extending. The flexibility of the spring fingers 26, thus, allows for the axial, lateral movement. Furthermore, the tube coupling 10 may allow for angular rotation of the first tube 12 and the second tube 14 with respect to each other. The ball and socket joint created by the ball portion 50 (FIG. 6) and the socket portion 70 (FIG. 7) may allow for the angular rotation. That is, the ball portion 50 may be allowed to rotate and/or to move within the socket portion 70. This may accommodate rotation, torsion, and/or angulation between the first tube 12 and the second tube 14.

Figure 10:
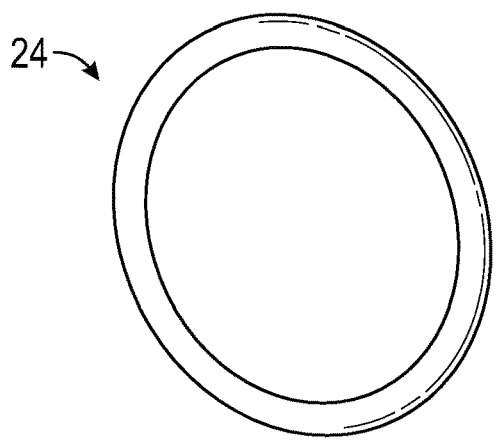
FIG. 10 shows a schematic perspective view of a compressive ring of a tube coupling, according to an embodiment of the present disclosure.
Figure 11A:
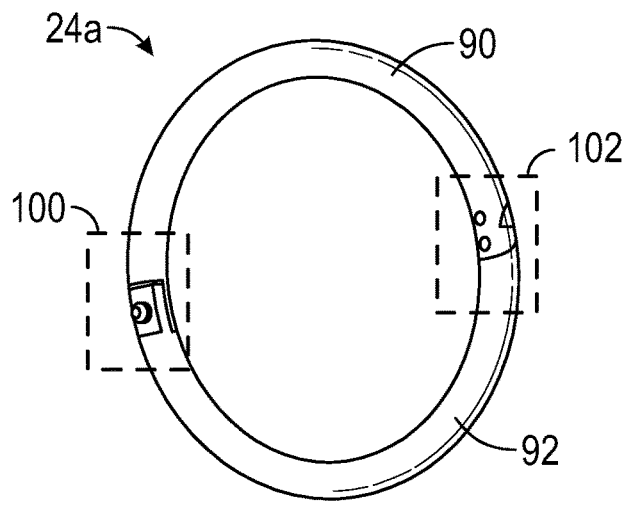
FIG. 11A shows a schematic perspective view of a compressive ring of a tube coupling, according to an embodiment of the present disclosure.
Figure 11B:
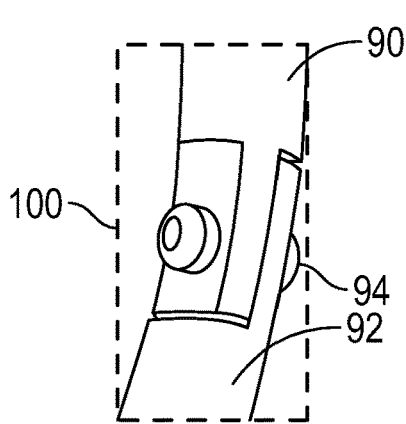
FIG. 11B shows a schematic enlarged view of a portion of the compressive ring of FIG. 11A, according to an embodiment of the present disclosure.
Figure 11C:
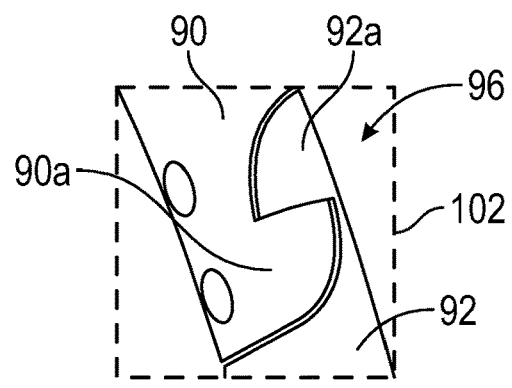
FIG. 11C shows a schematic enlarged view of a portion of the compressive ring of FIG. 11A, according to an embodiment of the present disclosure.

FIG. 10 and FIGS. 11A to 11C show exemplary compressive rings 24 for the tube coupling 10. In FIG. 10, the compressive ring 24 may be a continuous, unitary ring. In FIGS. 11A to 11C, the compressive ring 24 may be a hinged ring 24a. The hinged ring 24a of FIG. 11A may include a first body 90 coupled to a second body 92 with a hinge, such as shown in the FIG. 11A enlarged portion 100. The compressive ring 24 of FIG. 11A may be selectively openable and closable with a latch 96 (FIG. 11C). The FIG. 11A enlarged portion 100 shown in FIG. 11B, shows the first body 90 coupled with a pin 94 to the second body 92. However, other hinge devices are contemplated. The FIG. 11A enlarged portion 102 shown in FIG. 11C shows the first body 90 having a first body lip 90a and the second body 92 having a second body lip 92a. When the latch 96 is closed, the first body lip 90a and the second body lip 92a may be engaged. When the latch 96 is open, the first body lip 90a and the second body lip 92a may be disengaged.

Figure 12A:
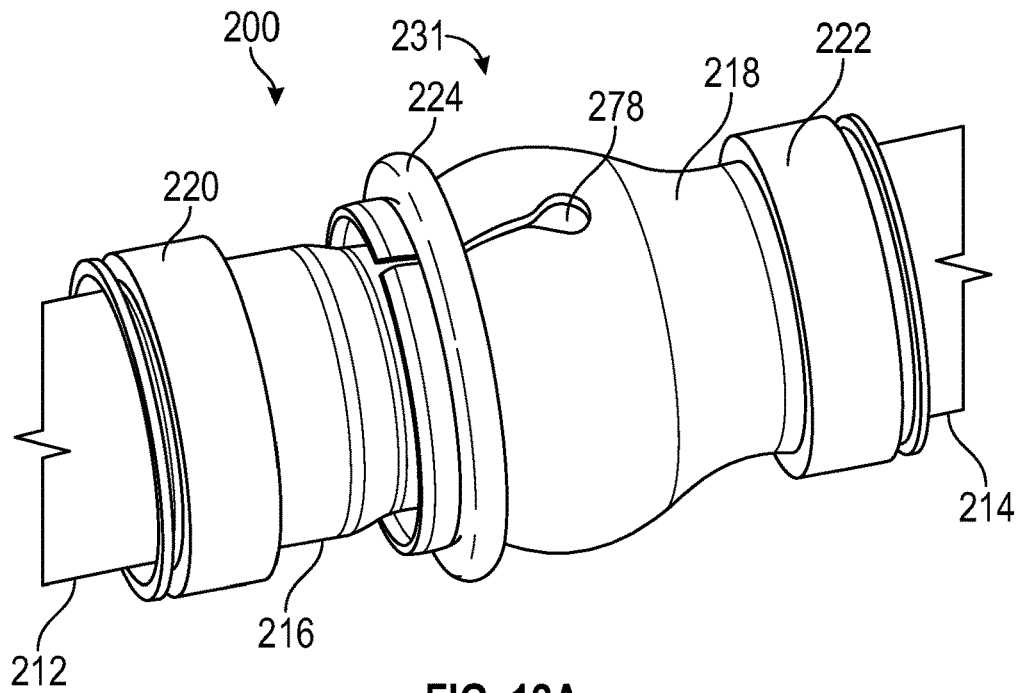
FIG. 12A shows a schematic perspective view of a tube coupling, according to an embodiment of the present disclosure.
Figure 12B:
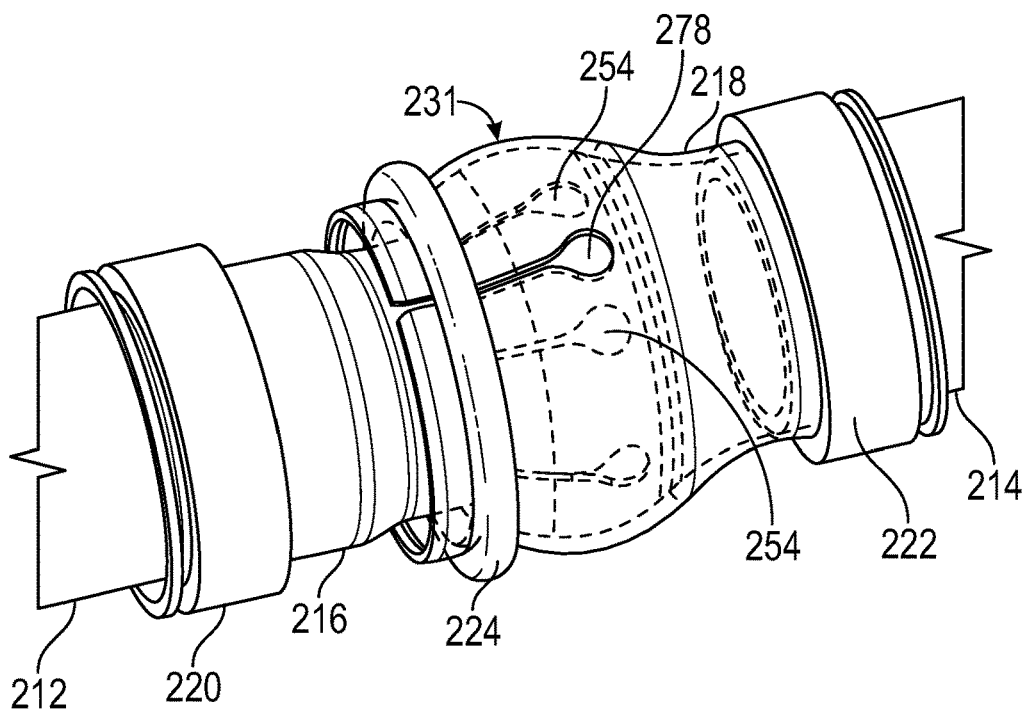
FIG. 12B shows a schematic perspective view of the tube coupling of FIG. 12A, according to an embodiment of the present disclosure.
Figure 12C:
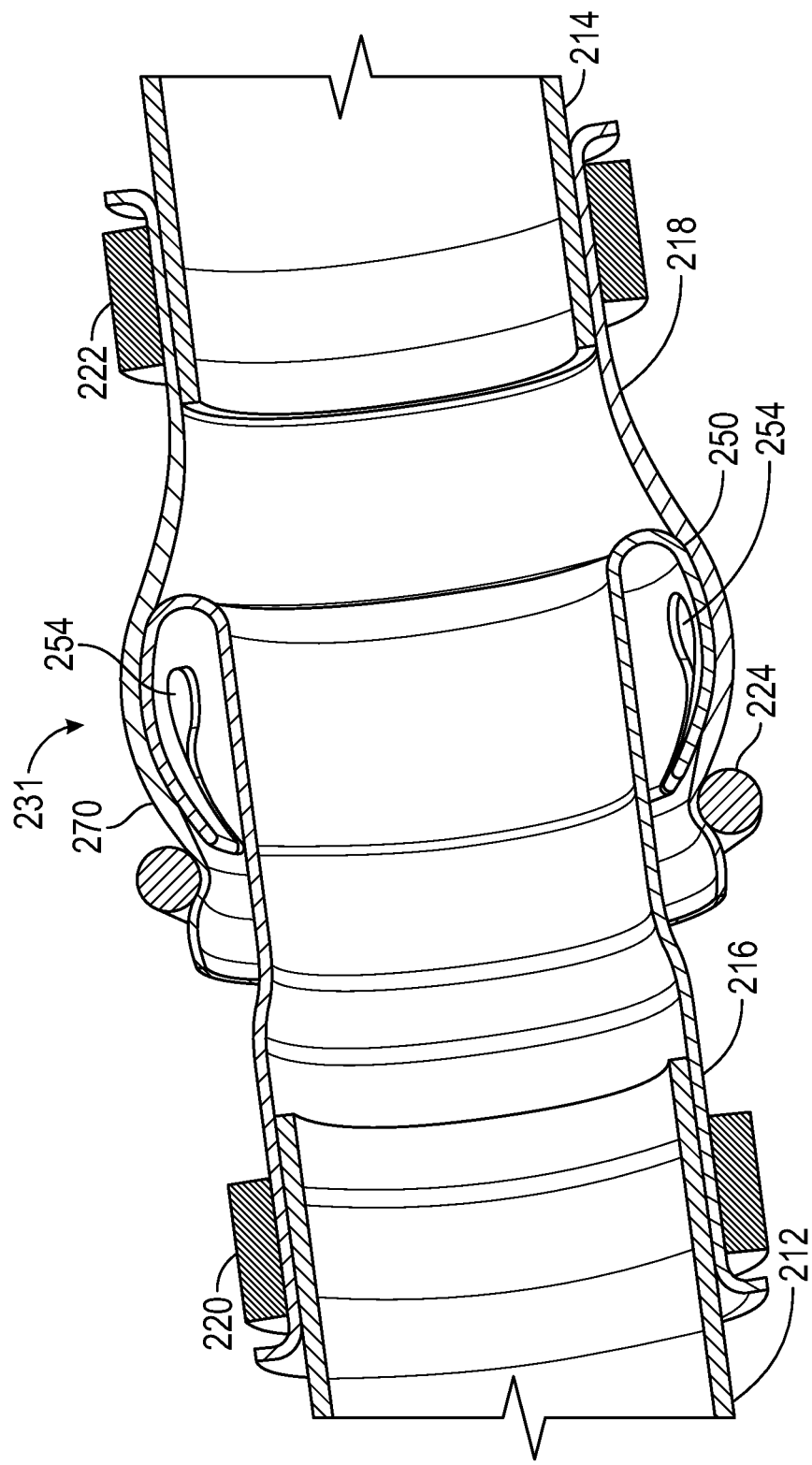
FIG. 12C shows a schematic cross-sectional perspective view of the tube coupling of FIG. 12A, taken along a center axis of the tube coupling, according to an embodiment of the present disclosure.

FIGS. 12A to 12C show a tube coupling 200. The tube coupling 200 may be the same as or similar to the tube coupling 10. The tube coupling 200 may couple a first tube 212 to a second tube 214. The tube coupling 200 may include an inner shroud 216 and an outer shroud 218. The tube coupling 200 may include a compressive ring 224, a first band 220, and a second band 222. The aforementioned components may be the same as or similar to like components described with respect to the tube coupling 10. The inner shroud 216 may include a plurality of inner shroud openings 254 and the outer shroud 218 may include a plurality of outer shroud openings 278. The plurality of inner shroud openings 254 may be flexible cutouts in the ball portion of the inner shroud 216. When assembled, the outer shroud openings 278 and the inner shroud openings 254 may be misaligned. The misalignment of the outer shroud openings 278 and the inner shroud openings 254 may generate a seal such that there is no leakage out of the ball and socket joint 231. The compressive ring 224 may maintain the outer shroud 218 in surface-to-surface contact and engagement with the inner shroud 216 at the ball and socket joint 231.

As was described with respect to tube coupling 10, the tube coupling 200 may form the ball and socket joint 231. The inner shroud 216 may include a ball portion 250 (FIG. 12C) and the outer shroud 218 may include a socket portion 270 (FIG. 12C). The ball and socket joint 231 may allow for angular movement of the inner shroud 216 with respect to the outer shroud 218.

In FIGS. 12A to 12C, the outer shroud 218 may be formed without spring fingers (e.g., FIG. 8, 26). Accordingly, the inner shroud 216 need not include protrusions for separating the spring fingers. The tube coupling 200 may be selected to provide additional torsional moment (e.g., rotation about the central tube axis) as compared to the tube coupling 10. The tube coupling 200 may be selected over the tube coupling 10 when more torsion will be experienced between the first tube 212 and the second tube 214. Axial movement is still permitted (even without the inclusion of the spring fingers), but the axial movement is limited to a finite distance due to a distal end of the ball portion of the inner shroud contacting the decreasing diameter inner wall of the socket portion of the outer shroud 218.

Figure 13A:
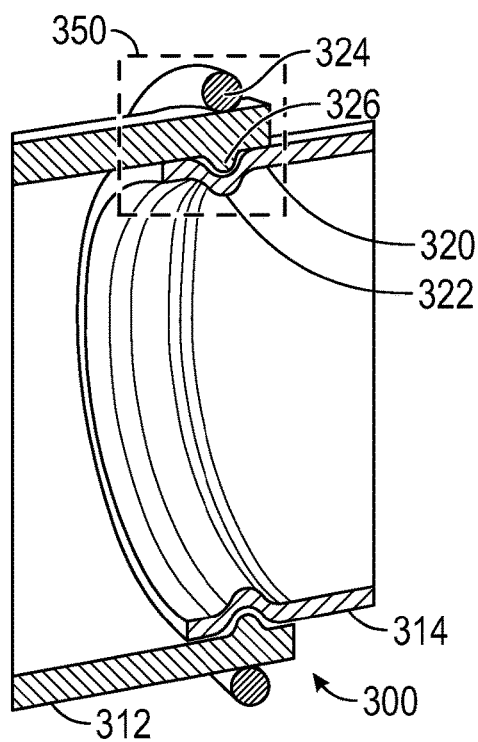
FIG. 13A shows a schematic cross-sectional perspective view of a tube coupling, taken along a center axis of the tube coupling, according to an embodiment of the present disclosure.
Figure 13B:
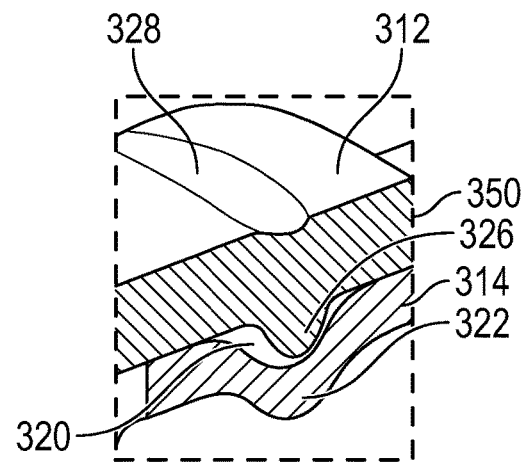
FIG. 13B shows a schematic enlarged view of a portion of the tube coupling of FIG. 13A, according to an embodiment of the present disclosure.

FIGS. 13A and 13B show a tube coupling 300. FIG. 13B shows an FIG. 13A enlarged portion 350 of the tube coupling 300. The tube coupling 300 may couple a first tube 312 and a second tube 314. The tube coupling 300 may include a surface feature on both the first tube 312 and the second tube 314. For example, the first tube 312 may include a first tube protrusion 326 on an inner surface of the first tube 312. The second tube 314 may include a second tube indentation 322 that forms a second tube groove 320 on an outer surface of the second tube 314. The second tube groove 320 may receive the first tube protrusion 326. The first tube protrusion 326 may be a continuous circular shape on the inner surface of the first tube 312 and the second tube groove 320 may be a continuous circular shape on the outer surface of the second tube 314. The shape of the first tube protrusion 326 and the second tube groove 320 may take different shapes, as long as there is a similar profile between the two components to allow for conforming of the first tube protrusion 326 with the second tube groove 320. The tube coupling 300 may include a compressive ring 324. The compressive ring 324 may provide a compressive force to the first tube 312 and the second tube 314 to couple the first tube 312 and the second tube 314 together. The compressive ring 324 may be located in a compressive ring groove 328 on the outer surface of the first tube 312. The compressive ring groove 328 may be a seating groove for the compressive ring 324. The compressive ring 324 may be aligned with the first tube protrusion 326 and the second tube groove 320 to provide a compressive force thereto to secure the first tube protrusion 326 within the second tube groove 320.

Figure 14A:
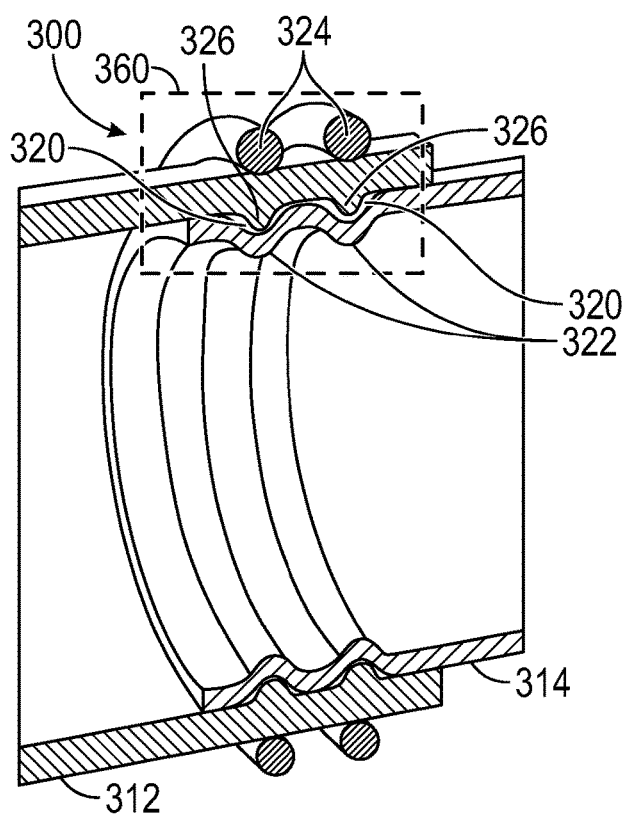
FIG. 14A shows a schematic cross-sectional perspective view of a tube coupling, taken along a center axis of the tube coupling, according to an embodiment of the present disclosure.
Figure 14B:
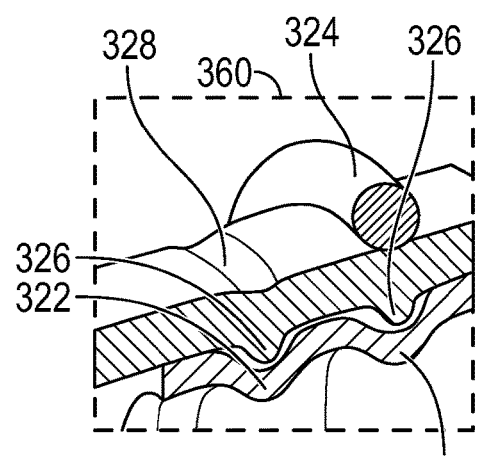
FIG. 14B shows a schematic enlarged view of a portion of the tube coupling of FIG. 14A, according to an embodiment of the present disclosure.

FIGS. 14A and 14B show the tube coupling 300 having two sets of the previously described features. FIG. 14B shows an FIG. 14A enlarged portion 360 of the tube coupling 300. In FIGS. 14A and 14B, the tube coupling 300 may include two surface features on each of the first tube 312 and the second tube 314. For example, the first tube 312 may include two first tube protrusions 326 on an inner surface of the first tube 312. The second tube 314 may include two second tube indentations 322 that form two second tube grooves 320 on an outer surface of the second tube 314. The second tube grooves 320 may receive the first tube protrusions 326. The tube coupling 300 may include two compressive rings 324. The compressive rings 324 may be located in two compressive ring grooves 328 on the outer surface of the first tube 312. Each of the compressive rings 324 may be aligned with each of the first tube protrusion 326 and each of the second tube grooves 320 to provide a compressive force thereto to secure the first tube protrusions 326 within the second tube grooves 320. Although one set of features (FIGS. 13A and 13B) and two sets of features (FIGS. 14A and 14B) are described, more may be provided.

Figure 15:
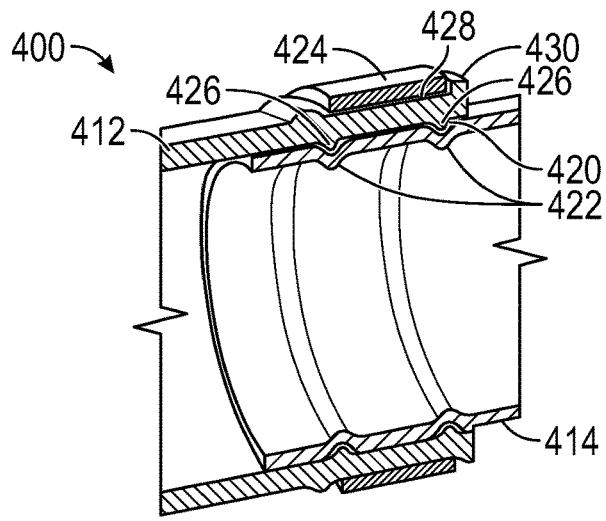
FIG. 15 shows a schematic cross-sectional perspective view of a tube coupling, taken along a center axis of the tube coupling, according to an embodiment of the present disclosure.

FIG. 15 shows a tube coupling 400. The tube coupling 400 may couple a first tube 412 to a second tube 414. The first tube 412 and the second tube 414 may include surface features. For example, the first tube 412 may include one or more first tube protrusions 426 on an inner surface thereof. The second tube 414 may include one or more second tube indentations 422 that provide one or more first tube grooves 420 for the first tube protrusions 426. Although two of each are shown, more or fewer may be provided. The number of surface features may vary as long as the number of surface features on the first tube 412 matches the number of surface features on the second tube 414. The first tube 412 may include a first tube groove 428 and a first tube lip 430 for receiving a band 424. The band 424 may be a shape memory alloy band. The band 424 may secure the first tube 412 to the second tube 414.

Figure 16:
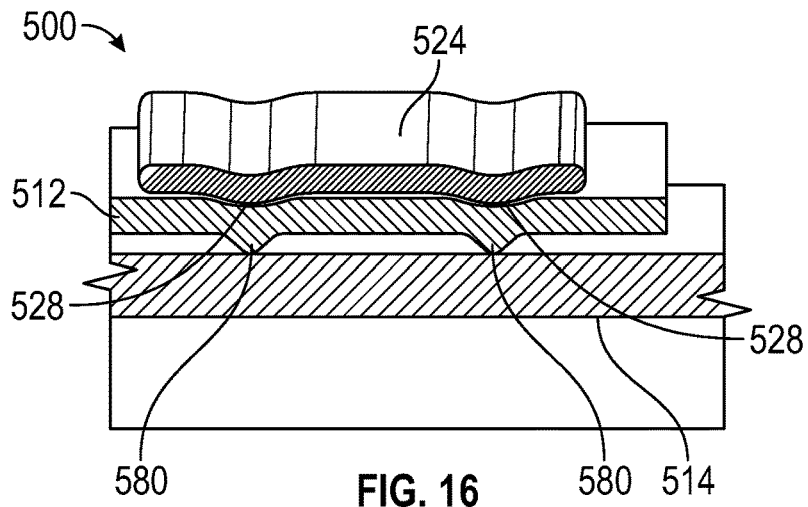
FIG. 16 shows a schematic cross-sectional perspective view of a tube coupling, taken along a center axis of the tube coupling, according to an embodiment of the present disclosure.

FIG. 16 shows a tube coupling 500. The tube coupling 500 may couple a first tube 512 to a second tube 514. The first tube 512 and/or the second tube 514 may include surface features. For example, the first tube 512 may include one or more first tube protrusions 580 on an inner surface thereof. Although two first tube protrusions 580 are shown, more or fewer may be provided. The first tube 512 may include first tube grooves 528 for receiving protrusions on a band 524. The band 524 may be a shape memory alloy band. The band 524 may secure the first tube 512 to the second tube 514.

Figure 17:
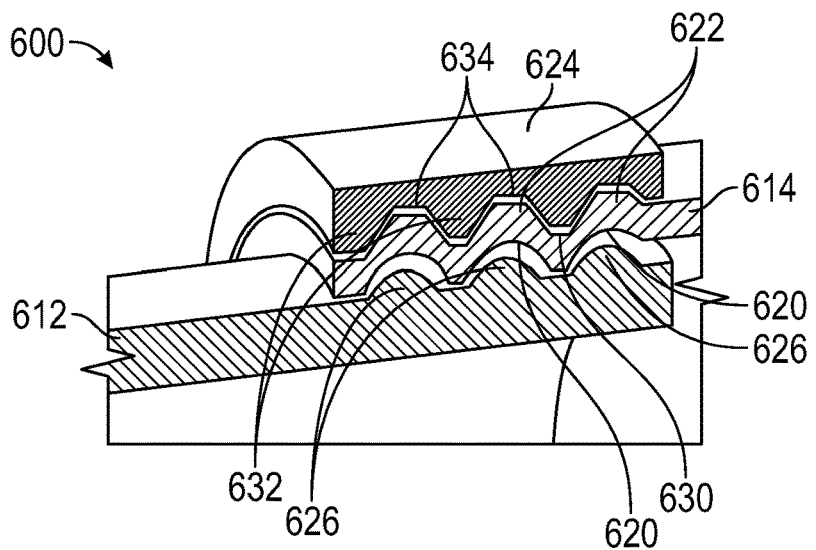
FIG. 17 shows a schematic cross-sectional perspective view of a tube coupling, taken along a center axis of the tube coupling, according to an embodiment of the present disclosure.

FIG. 17 shows a tube coupling 600. The tube coupling 600 may couple a first tube 612 to a second tube 614. A band 624 may secure the first tube 612 to the second tube 614. The band 624 may be a shape memory alloy band. The first tube 612, the second tube 614, and/or the band 624 may include surface features. For example, the first tube 612 may include one or more first tube protrusions 626 on an outer surface thereof. The second tube 614 may include one or more second tube indentations 622 that provide one or more second tube grooves 620 for receiving the first tube protrusions 626. The second tube indentations 622 may present as protrusions on an outer surface of the second tube 614 and second tube grooves 620 on an inner surface of the second tube 614. The band 624 may include one or more band protrusions 632 that create one or more band grooves 634. When assembled, a band groove 634 on the band 624 may receive a second tube indentation 622 on the second tube 614. The second tube groove 620 of the second tube indentation 622 may receive a first tube protrusion 626 on the first tube 612. Furthermore, a second tube groove 630 between the second tube indentations 622 on the second tube 614 may receive the band protrusions 632 on the band 624. Although three of each surface feature are shown, more or fewer may be provided. The number of surface features may vary as long as the number of surface features on the first tube 612 matches the number of surface features on the second tube 614 and the number of surface features on the band 624.

Figure 18A:
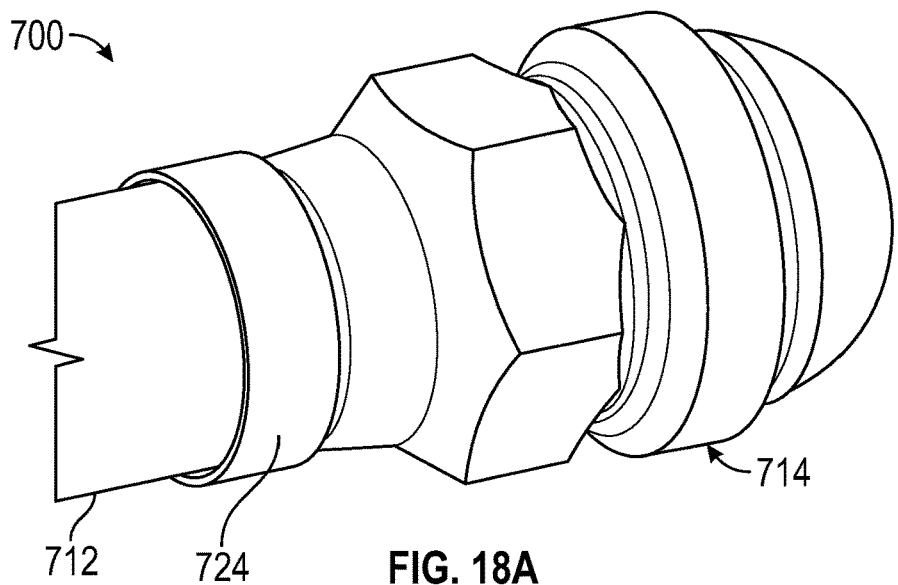
FIG. 18A shows a schematic perspective view of a tube coupling, according to an embodiment of the present disclosure.
Figure 18B:
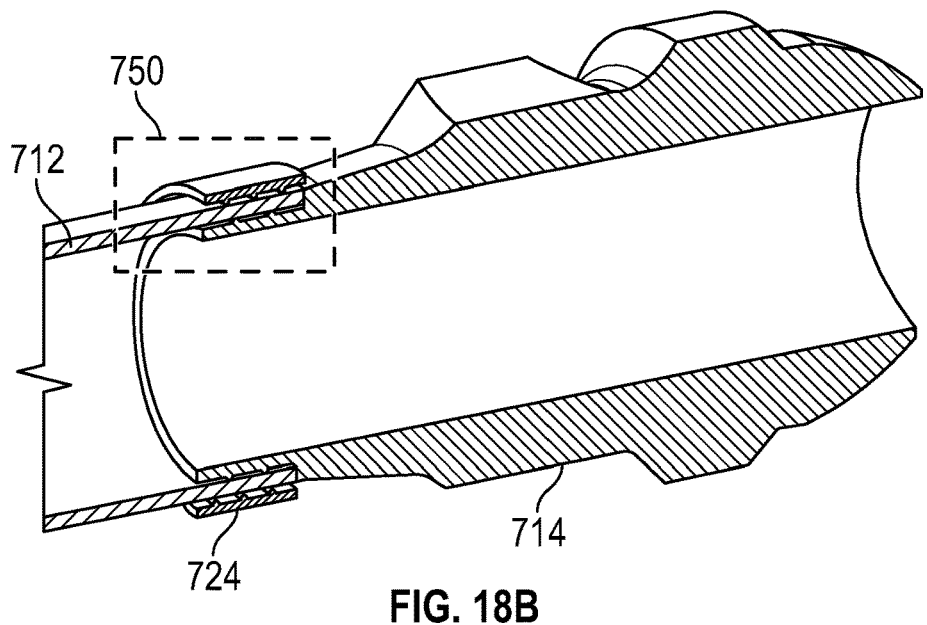
FIG. 18B shows a schematic cross-sectional perspective view of the tube coupling of FIG. 18A, taken along a center axis of the tube coupling, according to an embodiment of the present disclosure.
Figure 18C:
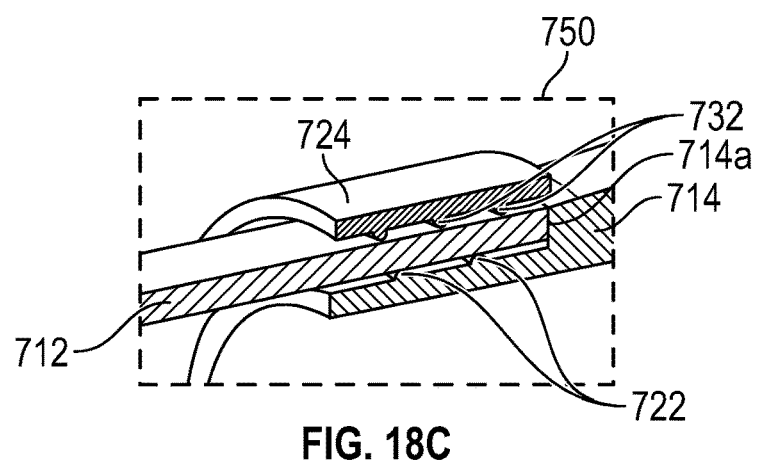
FIG. 18C shows a schematic enlarged view of a portion of the tube coupling of FIG. 18B, according to an embodiment of the present disclosure.

FIGS. 18A to 18C show views of a tube coupling 700. The tube coupling 700 may couple a first tube 712 to a second tube 714. The second tube 714 may be a male coupling. A band 724 may secure the first tube 712 to the second tube 714. The band 724 may be a shape memory alloy band. The second tube 714 and/or the band 724 may include surface features. For example, as shown in the FIG. 18B enlarged portion 750 of FIG. 18C, the second tube 714 may include one or more second tube protrusions 722 on an outer surface of the second tube 714. The band 724 may include one or more band protrusions 732 on an inner surface of the band 724. The second tube 714 may include a second tube shoulder 714a for receiving a distal end of the first tube 712. Although three surface features on the band 724 and two surface features on the second tube 714 are shown, more or fewer may be provided.

Figure 19A:
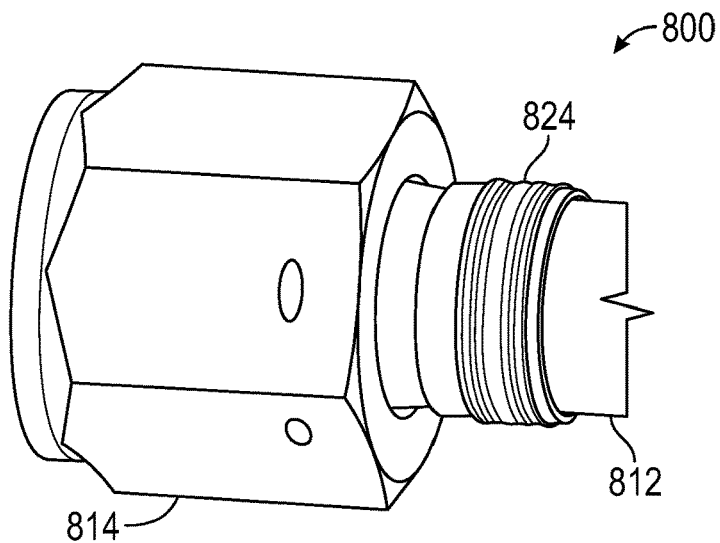
FIG. 19A shows a schematic perspective view of a tube coupling, according to an embodiment of the present disclosure.
Figure 19B:
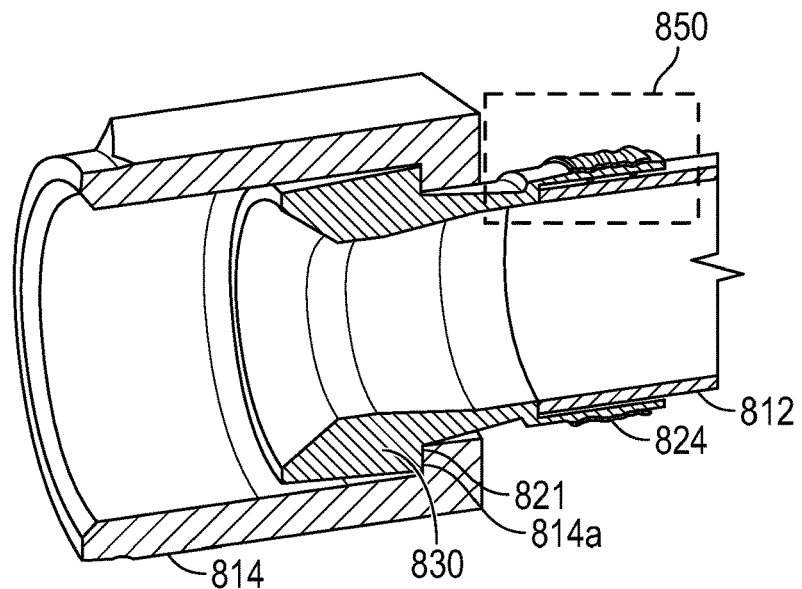
FIG. 19B shows a schematic cross-sectional perspective view of the tube coupling of FIG. 19A, taken along a center axis of the tube coupling, according to an embodiment of the present disclosure.
Figure 19C:
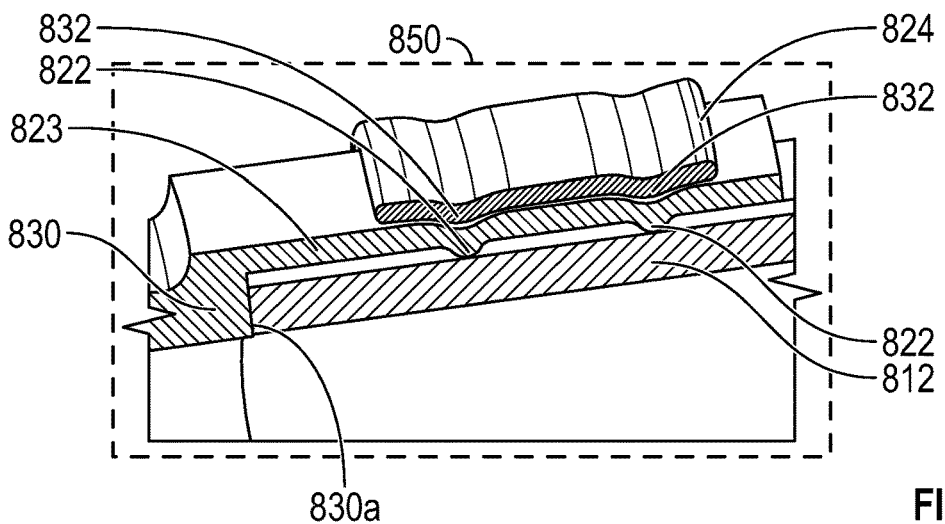
FIG. 19C shows a schematic enlarged view of a portion of the tube coupling of FIG. 19B, according to an embodiment of the present disclosure.

FIGS. 19A to 19C show views of a tube coupling 800. The tube coupling 800 may couple a first tube 812 to a second tube 814. The second tube 814 may be a ferrule coupling. The ferrule coupling may be a circular clamp to connect together and/or join conduits, pipes, or tubes. The tube coupling 800 may include a connection member 830. The connection member 830 may be received within the second tube 814 such that a first connection member shoulder 821 of the connection member 830 interacts with a second tube shoulder 814a on the second tube 814. A second connection member shoulder 830a of the connection member 830 may receive a distal end of the first tube 812. A band 824 may secure the connection member 830 to the first tube 812. The band 824 may be a shape memory alloy band. The connection member 830 and/or the band 824 may include surface features. For example, as shown in the FIG. 19B enlarged portion 850 of FIG. 19C, the connection member 830 may include one or more connection member protrusions 822 on an inner surface of an enlarged diameter portion 823. The band 824 may include one or more band protrusions 832 on an inner surface of the band 824. The one or more band protrusions 832 may be aligned with the one or more connection member protrusions 822. Although two surface features on the band 824 and two surface features on the connection member 830 are shown, more or fewer may be provided. The number of surface features on the band 824 may match the number of surface features on the connection member 830.

Figure 20A:
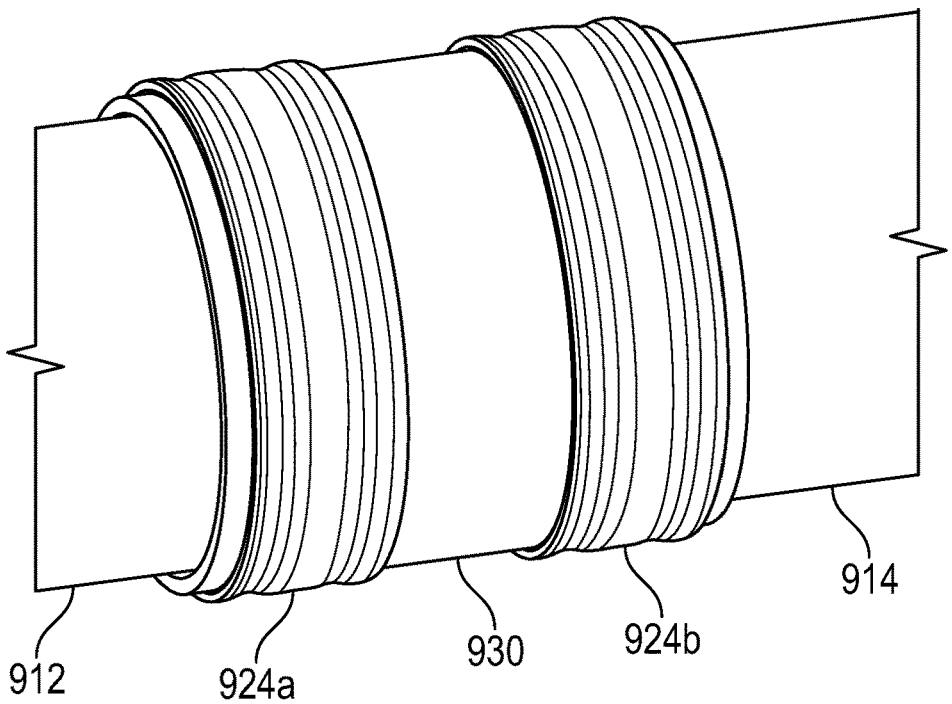
FIG. 20A shows a schematic perspective view of a tube coupling, according to an embodiment of the present disclosure.
Figure 20B:
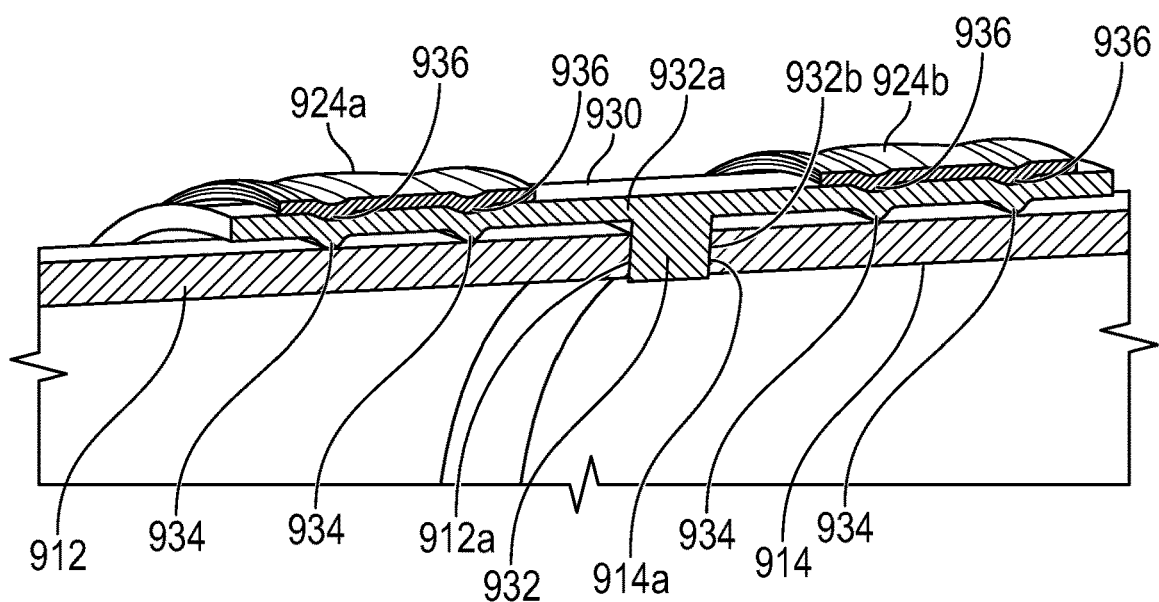
FIG. 20B shows a schematic cross-sectional perspective view of the tube coupling of FIG. 20A, taken along a center axis of the tube coupling, according to an embodiment of the present disclosure.

FIGS. 20A to 20B show views of a tube coupling 900. The tube coupling 900 may couple a first tube 912 to a second tube 914. The tube coupling 900 may include a connection member 930. The connection member 930 may be substantially cylindrical with a connection member inner projection 932. A first tube distal end 912a of the first tube 912 may contact a first side 932a of the connection member inner projection 932. A second tube distal end 914a of the second tube 914 may contact a second side 932b of the connection member inner projection 932. The first side 932a and the second side 932b may be opposing sides of the connection member inner projection 932. The connection member 930 may include a plurality of connection member protrusions 934 on an inner surface of the connection member 930. A first band 924a may couple the connection member 930 to the first tube 912. A second band 924b may couple the connection member 930 to the second tube 914. Each of the first band 924a and the second band 924b may include a plurality of band protrusions 936 on an inner surface thereof. Each of the plurality of band protrusions 936 may be aligned with a respective one of the plurality of connection member protrusions 934 on the connection member 930. Although two surface features on each of the first band 924a and the second band 924b and four surface features on the connection member 930 are shown, more or fewer may be provided. The total number of surface features on each the first band 924a and the second band 924b may match the number of surface features on the connection member 930. The surface features on the connection member 930 may be located on either side of the connection member inner projection 932 such that the surface features of the respective band are aligned with the surface features on either side of the connection member inner projection 932 and aligned with a respective one of the first tube 912 and the second tube 914.

The band and/or the compressive ring of FIGS. 13A to 20B may be a shape memory alloy. The tube couplings of FIGS. 13A to 20B may allow for locally deforming and/or yielding through the shape memory alloy band and/or compressive ring. The shape memory alloy may allow for a permanent tube connection. Band and/or compressive rings of FIGS. 13A to 20B may be oversized in a martensitic state and then warmed up to an original lower size to generate an elastic radial compressive force on the tubes. The compression of the band and/or compressive ring on the tubes may result in swaging on the tubes or other members beneath the band and/or compressive ring. Swaging may result when portions of a first component, here the component including the protrusions and/or indentations, are pressed into an adjacent component, due to the compression of the band and/or the compressive ring. The swaging may result in the aforementioned indentations and protrusions pressing into adjacent members to generate a connection. For example, the band and/or the compressive ring may generate a high radial compressive force, which may swage the underlying body with radial teeth over the tube. The tube surface may be locally yielded by swaging teeth and may develop a metal-to-metal permanent connection, a leak proof connection, and/or a weld-free sealing connection.

The band and/or the compressive ring, when formed of a shape memory alloy, may be initially produced in an austenitic state with a first inner diameter that is slightly undersized than the outer diameter of the underneath swaged body (e.g., in FIG. 13A, the underlying body is the first tube 312; in FIG. 17, the underlying body is the second tube 614; in FIG. 19B, the underlying body is the connection member 830, etc.). The band and/or compressive ring is cooled to the martensitic state, then expanded to a second inner diameter that is larger than the underneath swaged body. The band and/or the compressive ring is then positioned to the installation location and heated to attain back the austenitic state. The band and/or the compressive ring returns to the "undersized" first inner diameter and generates a high radial compressive force on the underlying body. In the examples where protrusions are provided, the band and/or compressive ring may cause swaging of the underlying body with the radial teeth/protrusions. This may cause the tube surface to be locally yielded due to the swaging protrusions and develop a metal-to-metal permanent, leak proof, weld-free seal.

The protrusions of FIGS. 13A to 20B may be omitted, may be moved to other components and/or surface, and/or may have different shapes, sizes, or orientations. A seating groove (e.g., compressive ring groove 328 in FIG. 13B) may be provided in any of the tube couplings.

The tube couplings shown in the elements of the present disclose may allow for flexible coupling of two fluid carrying conduits (e.g., the first tube and the second tube as described herein). The tube couplings of the present disclosure may allow for articulation between the two conduits. The tube couplings of the present disclosure may although for thermal expansion experienced during use of the tubes and tube couplings and may allow for dynamically decoupling of the components. The tube couplings of the present disclosure may allow for high temperature applications and may be capable of handling thermal growth (e.g., thermal expansion).

The tube couplings of the present disclosure may provide a coupling without brazes and/or without welds. That is, the tube couplings of the present disclosure may be a non-brazed and non-welded tube coupling. The tube couplings of the present disclosure may be considered to be weldless. The tube couplings of the present disclosure may be flexible joint assemblies and may be weld-free joint assemblies.

The tube couplings of the present disclosure may provide a non-welded and non-threaded permanent tube joint using shape memory alloy bands or rings. The bands and rings of the present disclosure may be compressive bands and compressive rings. The tube couplings of the present disclosure may eliminate inspection procedures required on welded joints, may address failures due to stress concentration related to weld quality, may reduce repair downtime as compared to welded connections, may eliminate a hot working process, may be environmentally friendly, and/or may allow for leaner manufacturing by eliminating and/or reducing weld related activities.

The tube couplings of the present disclosure may include little or no features extending into the passageway or bores of the tubes being coupled. That is, the flow through the tubes and the tube coupling may not be obstructed or may be minimally obstructed by features of the tube coupling. This may result in low pressure loss or no pressure loss of the flow through the tube coupling from the first tube to the second tube.

The tube couplings of the present disclosure may include a wear resistant layer on the wear surfaces of the coupling. The wear resistance layer may be achieved with flame spraying or other coating methods. For example, the surfaces of the ball portion and the socket portion, which are in constant contact, may be coated with a wear coating and/or may be formed of a wear resistant material. The wear resistant layer may be a dry film lubricant, polytetrafluoroethylene (PTFE), graphite, molybdenum disulfide, etc.

The shape memory alloy of the present disclosure may be nickel titanium, also known as Nitinol, although other shape memory alloys are contemplated. The shape memory alloy may allow for the tube couplings of the present disclosure to be permanent joints without the need for welding, brazing, or the like. Thus, the shape memory alloy may allow for weldless or weld-free tube couplings.

The tube couplings of the present disclosure that include a ball and socket joint, and may include a spring finger device capable of managing thermal expansion, angulation, torsion, and vibration of the tubes and tube coupling. The inner shroud and the outer shroud of the present disclosure may be produced through electroforming. The thickness of the inner shroud and the thickness of the outer shroud may be varied or selected to allow for a desired or required flexibility of the tube coupling. The spring fingers of the outer shroud may have variable thickness or constant thickness.

The inner shroud and/or the outer shroud of the present disclosure may be formed of nickel, steel, INCONEL®, high-strength nickel alloys, high-temperature tolerant materials, or combinations thereof. The inner shroud may be a nitrogen strengthened stainless steel (e.g., an austenitic stainless steel Nitronic alloy) and/or other wear resistant material. The inner shroud and the outer shroud may be formed with electroforming, additive manufacturing, or other manufacturing methods (e.g., sheet metal forming, hydroforming, electroforming, mechanical dye form press, blow forming, electrical discharge machining (EDM) with laser finishing, etc.)

The tube couplings of the present disclosure may be provided in gas turbine engines, other engines, and other aspects of the aircraft industry. The tube couplings may be provided in external pipes sitting on an engine casing. For example, the tube couplings may be used in an environmental control system, a fourth stage manifold, a seventh stage manifold, a cooling manifold, a starter duct, an anti-ice duct, air conduits, and/or a bleed duct. The tube couplings of the present disclosure may be provided in any indication where coupling of two tubes is needed. The tube couplings of the present disclosure may allow for a flexible joint between an airframe and engine ducts.

Further aspects of the present disclosure are provided by the subject matter of the following clauses.

A tube coupling for coupling a first tube and a second tube includes an inner shroud including a ball portion, an outer shroud including a socket portion, the socket portion configured to receive the ball portion, and a compressive ring configured to elastically compress the outer shroud onto the inner shroud. The ball portion and the socket portion form a ball and socket joint, the ball and socket joint configured to allow relative angular movement and relative axial movement between the inner shroud and the outer shroud.

The tube coupling of any preceding clause, wherein the compressive ring is a shape memory alloy.

The tube coupling of any preceding clause, wherein the compressive ring is a hinged ring.

The tube coupling of any preceding clause, wherein the tube coupling is weld-free.

The tube coupling of any preceding clause, wherein a flow through the first tube and the second tube is not obstructed by an interior of the tube coupling such that there is little pressure loss or no pressure loss through the tube coupling.

The tube coupling of any preceding clause, further comprising a first wear resistance layer on an inner surface of the socket portion and a second wear resistance layer on an outer surface of the ball portion.

The tube coupling of any preceding clause, further comprising a first band configured to couple the inner shroud to the first tube and a second band configured to couple the outer shroud to the second tube.

The tube coupling of any preceding clause, the inner shroud further comprising a plurality of radial teeth extending inwardly from an inner surface of the inner shroud, the plurality of radial teeth configured to be swaged into the first tube due to the first band and configured to be swaged into the second tube due to the second band.

The tube coupling of any preceding clause, the inner shroud further comprising a plurality of openings in the ball portion, the plurality of openings configured to allow flexibility of the ball portion.

The tube coupling of any preceding clause, the outer shroud further comprising a plurality of openings in the socket portion, the plurality of openings configured to allow flexibility of the socket portion, wherein the plurality of openings in the ball portion and the plurality of openings in the socket portion are misaligned to provide a fluid-tight seal.

The tube coupling of any preceding clause, the outer shroud further comprising a plurality of spring fingers, the plurality of spring fingers configured to allow relative axial movement between the inner shroud and the outer shroud.

The tube coupling of any preceding clause, wherein each spring finger of the plurality of spring fingers comprise a flat portion and a spring portion, the spring portion being formed of convolutions of crests and valleys.

The tube coupling of any preceding clause, the inner shroud further comprising a longitudinal portion and a plurality of protrusions on the longitudinal portion, wherein the plurality of protrusions are configured to separate adjacent spring fingers of the plurality of spring fingers.

The tube coupling of any preceding clause, wherein each spring finger of the plurality of spring fingers each has a variable thickness.

The tube coupling of any preceding clause, wherein each spring finger of the plurality of spring fingers each has a constant thickness.

A tube assembly includes a first tube, a second tube, and a tube coupling for coupling the first tube to the second tube. The tube coupling includes an inner shroud including a ball portion, an outer shroud including a socket portion, the socket portion configured to receive the ball portion, and a compressive ring configured to elastically compress the outer shroud onto the inner shroud. The ball portion and the socket portion form a ball and socket joint, the ball and socket joint configured to allow relative angular movement and relative axial movement between the first tube and the second tube.

The tube assembly of any preceding clause, wherein the compressive ring is a shape memory alloy.

The tube assembly of any preceding clause, wherein the compressive ring is a hinged ring.

The tube assembly of any preceding clause, wherein the tube coupling is weld-free.

The tube assembly of any preceding clause, wherein a flow through the first tube and the second tube is not obstructed by an interior of the tube coupling such that there is little pressure loss or no pressure loss through the tube coupling.

The tube assembly of any preceding clause, further comprising a first wear resistance layer on an inner surface of the socket portion and a second wear resistance layer on an outer surface of the ball portion.

The tube assembly of any preceding clause, further comprising a first band configured to couple the inner shroud to the first tube and a second band configured to couple the outer shroud to the second tube.

The tube assembly of any preceding clause, the inner shroud further comprising a plurality of radial teeth extending inwardly from an inner surface of the inner shroud, the plurality of radial teeth configured to be swaged into the first tube due to the first band and configured to be swaged into the second tube due to the second band.

The tube assembly of any preceding clause, the inner shroud further comprising a plurality of openings in the ball portion, the plurality of openings configured to allow flexibility of the ball portion.

The tube assembly of any preceding clause, the outer shroud further comprising a plurality of openings in the socket portion, the plurality of openings configured to allow flexibility of the socket portion, wherein the plurality of openings in the ball portion and the plurality of openings in the socket portion are misaligned to provide a fluid-tight seal.

The tube assembly of any preceding clause, the outer shroud further comprising a plurality of spring fingers, the plurality of spring fingers configured to allow relative axial movement between the inner shroud and the outer shroud.

The tube assembly of any preceding clause, wherein the plurality of spring fingers comprise a flat portion and a spring portion, the spring portion being formed of convolutions of crests and valleys.

The tube assembly of any preceding clause, the inner shroud further comprising a longitudinal portion and a plurality of protrusions on the longitudinal portion, wherein the plurality of protrusions are configured to separate adjacent spring fingers of the plurality of spring fingers.

The tube assembly of any preceding clause, wherein each spring finger of the plurality of spring fingers each has a variable thickness.

The tube assembly of any preceding clause, wherein each spring finger of the plurality of spring fingers each has a constant thickness.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A tube coupling for coupling a first tube and a second tube, the tube coupling comprising:
   (a) an inner shroud including a ball portion;
   (b) an outer shroud including a socket portion, the socket portion configured to receive the ball portion;
   (c) a compressive ring configured to elastically compress the outer shroud onto the inner shroud;
   (d) a first band configured to couple the inner shroud to the first tube; and
   (e) a second band configured to couple the outer shroud to the second tube such that the tube coupling is weld-free,
   wherein the ball portion and the socket portion form a ball and socket joint, the ball and socket joint configured to allow relative angular movement and relative axial movement between the inner shroud and the outer shroud.

2. The tube coupling of claim 1, wherein the compressive ring is a shape memory alloy or is a hinged ring.

3. The tube coupling of claim 1, wherein a flow through the first tube and the second tube is not obstructed by an interior of the tube coupling.

4. The tube coupling of claim 1, the inner shroud further comprising a plurality of radial teeth extending inwardly from an inner surface of the inner shroud, the plurality of radial teeth configured to be swaged into the first tube due to the first band.

5. The tube coupling of claim 1, the inner shroud further comprising a plurality of openings in the ball portion, the plurality of openings configured to allow flexibility of the ball portion and the outer shroud further comprising a plurality of openings in the socket portion, the plurality of openings configured to allow flexibility of the socket portion, wherein the plurality of openings in the ball portion and the plurality of openings in the socket portion are misaligned to provide a fluid-tight seal.

6. The tube coupling of claim 1, the outer shroud further comprising a plurality of spring fingers, the plurality of spring fingers configured to allow relative axial movement between the inner shroud and the outer shroud.

7. The tube coupling of claim 6, wherein each spring finger of the plurality of spring fingers comprise a flat portion and a spring portion, the spring portion being formed of convolutions of crests and valleys and the inner shroud further comprising a longitudinal portion and a plurality of protrusions on the longitudinal portion, wherein the plurality of protrusions are configured to separate adjacent spring fingers of the plurality of spring fingers.

8. The tube coupling of claim 6, wherein each spring finger of the plurality of spring fingers each has a variable thickness.

9. The tube coupling of claim 6, wherein each spring finger of the plurality of spring fingers each has a constant thickness.

10. A tube assembly comprising the tube coupling of claim 1 for coupling a first tube to a second tube, the tube assembly further comprising the first tube and the second tube.

11. The tube assembly of claim 10, wherein the compressive ring is a shape memory alloy or a hinged ring.

12. The tube assembly of claim 10, wherein a flow through the first tube and the second tube is not obstructed by an interior of the tube coupling.

13. The tube assembly claim 10, the inner shroud further comprising a plurality of radial teeth extending inwardly from an inner surface of the inner shroud, the plurality of radial teeth configured to be swaged into the first tube due to the first band.

14. The tube assembly of claim 10, the inner shroud further comprising a plurality of openings in the ball portion, the plurality of openings configured to allow flexibility of the ball portion and the outer shroud further comprising a plurality of openings in the socket portion, the plurality of openings configured to allow flexibility of the socket portion, wherein the plurality of openings in the ball portion and the plurality of openings in the socket portion are misaligned to provide a fluid-tight seal.

15. The tube assembly of claim 10, the outer shroud further comprising a plurality of spring fingers, the plurality of spring fingers configured to allow relative axial movement between the inner shroud and the outer shroud.

16. The tube assembly of claim 15, wherein the plurality of spring fingers comprise a flat portion and a spring portion, the spring portion being formed of convolutions of crests and valleys and the inner shroud further comprising a longitudinal portion and a plurality of protrusions on the longitudinal portion, wherein the plurality of protrusions are configured to separate adjacent spring fingers of the plurality of spring fingers.

17. The tube assembly of claim 15, wherein each spring finger of the plurality of spring fingers each has a variable thickness.

18. The tube assembly of claim 15, wherein each spring finger of the plurality of spring fingers each has a constant thickness.

19. A tube coupling for coupling a first tube and a second tube, the tube coupling comprising:
(a) an inner shroud including a ball portion and a plurality of openings in the ball portion, the plurality of openings configured to allow flexibility of the ball portion;
(b) an outer shroud including a socket portion and a plurality of openings in the socket portion, the plurality of openings configured to allow flexibility of the socket portion and the socket portion configured to receive the ball portion; and
(c) a compressive ring configured to elastically compress the outer shroud onto the inner shroud,
wherein the ball portion and the socket portion form a ball and socket joint, the ball and socket joint configured to allow relative angular movement and relative axial movement between the inner shroud and the outer shroud, and
wherein the plurality of openings in the ball portion and the plurality of openings in the socket portion are misaligned to provide a fluid-tight seal.

20. A tube assembly comprising the tube coupling of claim 19 for coupling a first tube to a second tube, the tube assembly further comprising the first tube and the second tube.

21. A tube coupling for coupling a first tube and a second tube, the tube coupling comprising:
(a) an inner shroud including a ball portion;
(b) an outer shroud including a socket portion and a plurality of spring fingers, the socket portion configured to receive the ball portion; and
(c) a compressive ring configured to elastically compress the outer shroud onto the inner shroud
wherein the ball portion and the socket portion form a ball and socket joint, the ball and socket joint configured to allow relative angular movement and relative axial movement between the inner shroud and the outer shroud,
wherein the plurality of spring fingers are configured to allow relative axial movement between the inner shroud and the outer shroud, and
wherein each spring finger of the plurality of spring fingers comprise a flat portion and a spring portion, the spring portion being formed of convolutions of crests and valleys and the inner shroud further comprising a longitudinal portion and a plurality of protrusions on the longitudinal portion, wherein the plurality of protrusions are configured to separate adjacent spring fingers of the plurality of spring fingers.

22. A tube assembly comprising the tube coupling of claim 21 for coupling a first tube to a second tube, the tube assembly further comprising the first tube and the second tube.

* * * * *